United States Patent
Temel et al.

(10) Patent No.: US 12,286,534 B2
(45) Date of Patent: Apr. 29, 2025

(54) BINDER FOR AN AQUEOUS COATING COMPOSITION

(71) Applicant: ALLNEX AUSTRIA GMBH, Werndorf (AT)

(72) Inventors: Armin Temel, Graz-St Peter (AT); Florian Lunzer, Graz (AT); Robert Potzmann, Brussels (BE); Richard Hendrikus Gerrit Brinkhuis, Zwolle (NL)

(73) Assignee: ALLNEX AUSTRIA GMBH, Werndorf (AT)

( * ) Notice: Subject to any disclaimer, the term of this patent is extended or adjusted under 35 U.S.C. 154(b) by 595 days.

(21) Appl. No.: 17/423,002

(22) PCT Filed: Jan. 30, 2020

(86) PCT No.: PCT/EP2020/052343
§ 371 (c)(1),
(2) Date: Jul. 14, 2021

(87) PCT Pub. No.: WO2020/157228
PCT Pub. Date: Aug. 6, 2020

(65) Prior Publication Data
US 2022/0098406 A1   Mar. 31, 2022

(30) Foreign Application Priority Data

Feb. 1, 2019  (EP) ..................... 19155169
Mar. 18, 2019  (EP) ..................... 19163580

(51) Int. Cl.
| | |
|---|---|
| *C08G 18/08* | (2006.01) |
| *C08G 18/12* | (2006.01) |
| *C08G 18/42* | (2006.01) |
| *C08L 75/16* | (2006.01) |
| *C09D 133/06* | (2006.01) |
| *C09D 175/14* | (2006.01) |

(52) U.S. Cl.
CPC .......... *C08L 75/16* (2013.01); *C08G 18/0866* (2013.01); *C08G 18/12* (2013.01); *C08G 18/42* (2013.01); *C09D 133/06* (2013.01); *C09D 175/14* (2013.01)

(58) Field of Classification Search
CPC ..... C08L 75/16; C09D 133/06; C09D 175/14; C08G 18/0866; C08G 18/12; C08G 18/42

USPC .......................................................... 524/198
See application file for complete search history.

(56) References Cited

U.S. PATENT DOCUMENTS

| | | | |
|---|---|---|---|
| 2,759,913 A | 8/1956 | Hulse | |
| 4,217,396 A | 8/1980 | Heckles | |
| 4,408,018 A | 10/1983 | Bartman et al. | |
| 4,602,061 A | 7/1986 | Akkerman | |
| 4,871,822 A | 10/1989 | Brindöpke et al. | |
| 5,536,784 A | 7/1996 | Mao et al. | |
| 5,567,761 A | 10/1996 | Song | |
| 6,201,048 B1 | 3/2001 | Raynolds et al. | |
| 2002/0156145 A1 | 10/2002 | Van Den Berg et al. | |
| 2006/0135684 A1 | 6/2006 | Killilea | |
| 2013/0041091 A1* | 2/2013 | Brinkhuis | C08K 5/098 524/533 |

FOREIGN PATENT DOCUMENTS

| | | |
|---|---|---|
| EP | 0 448 154 | 9/1991 |
| EP | 1 328 565 | 9/2005 |
| EP | 2 374 836 | 10/2011 |
| EP | 3 492 507 | 6/2019 |
| JP | 9-310042 | 12/1997 |
| JP | 10-45993 | 2/1998 |
| JP | 2013-528670 | 7/2013 |
| WO | 2011/124663 | 10/2011 |

OTHER PUBLICATIONS

International Search Report (ISR) issued Mar. 12, 2020 in International (PCT) Application No. PCT/EP2020/052343.

* cited by examiner

*Primary Examiner* — Ruiyun Zhang
(74) *Attorney, Agent, or Firm* — Wenderoth, Lind & Ponack, L.L.P.

(57) ABSTRACT

The invention relates to a self-emulsifying polymer US comprises Michael donor groups, wherein the Michael donor groups are acidic C—H groups from activated methylene and/or methine groups, to an aqueous polymer dispersion containing a mixture thereof with compounds having Michael acceptor groups which are activated olefinically unsaturated groups, activated by an electron-withdrawing group, and a catalyst to promote the Michael reaction, to a paint binder prepared from the mixture and the catalyst, and to coating compositions comprising the paint binder and appropriate additives.

26 Claims, No Drawings

BINDER FOR AN AQUEOUS COATING COMPOSITION

FIELD OF THE INVENTION

The invention relates an aqueous oligomer or polymer dispersion wherein the dispersed oligomer or polymer comprises an average of at least two Michael donor groups in an oligomer or polymer molecule, and is a self-emulsifying oligomer or polymer which comprises incorporated moieties that have pending hydrophilic groups, or hydrophilic groups which form part of the oligomer or polymer chain, wherein the Michael donor groups are acidic C—H groups from activated methylene >CH$_2$ and/or methine =CH groups, also referred to by the IUPAC systematic name as "methylidene" for the former, and "methylylidene" or "methanylylidene" for the latter. The invention also relates to the self-emulsifying oligomer or polymer and to a process for the preparation of the said self-emulsifying oligomer or polymer and the said aqueous oligomer or polymer dispersion which has an average of at least two Michael donor groups in an oligomer or polymer molecule, and to a binder for an aqueous coating composition comprising as a first component, the said aqueous oligomer or polymer dispersion which has an average of at least two Michael donor groups in an oligomer or polymer molecule, and a second component hereinafter referred to as "Michael acceptor" which is at least one organic compound having at least two activated olefinically unsaturated groups, wherein activation of the unsaturated group is effected by at least one electronegative group

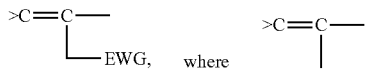 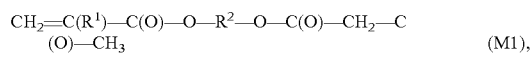

is one of the olefinically unsaturated groups, and "EWG" stands for "Electron-Withdrawing Group", the symbol ">" stands for two single bonds on the same carbon atom, the symbol "—" or "|" or "|" stands for one single bond on a carbon atom, and the symbol "=" stands for a double bond between two neighbouring carbon atoms. In the coating composition of the invention, the Michael donor is a water-dispersible oligomer or polymer, or both the Michael donor and the Michael acceptor are water-dispersible oligomers or polymers, or both Michael donor groups and Michael acceptor groups are present in a water-dispersible oligomer or polymer. The invention also relates to a coating composition comprising a non-polymeric and non-oligomeric Michael donor component which has an average of at least two Michael donor groups in its molecule, and as a second component, an aqueous dispersion of an oligomeric or polymeric Michael acceptor component, wherein the dispersed oligomer or polymer comprises an average of at least two Michael acceptor groups in an oligomer or polymer molecule, and is an externally emulsified oligomer or polymer or a self-emulsifying oligomer or polymer which comprises incorporated moieties that have pending hydrophilic groups, or hydrophilic groups which form part of the oligomer or polymer chain.

BACKGROUND OF THE INVENTION

Binders for coating compositions comprising Michael donor and Michael acceptor components which are cured by a Michael addition reaction between donor and acceptor have already been described in the past, such as by Noomen in Progress in Organic Coatings, vol. 32 (1997), pages 137 to 142. Coating compositions are disclosed therein which are based on a first system which comprises a malonate functional polyester resin, synthesised from pentane-diol and diethylmalonate, with an "equivalent weight: 195", the reaction product of 1 mol of the triisocyanurate of isophorone diisocyanate and 3 mol of hydroxybutyl acrylate, which system is catalysed with 1,8-diaza-bicyclo[5,4,0]undec-7-ene (DBU), see section 2.1; a second system which comprises the said malonate polyester in combination with an unsaturated urethane acrylate, catalysed with DBU, see section 2.2; and a third system which comprises the said malonate polyester in combination with the reaction product of 1 mol of isophoronediisocyanate and 2 mol of hydroxybutyl acrylate, catalysed with DBU, see section 2.3. A comparison has shown that the Michael addition-based coating showed much better retention of gloss and flexibility than a conventional alkyd-based coating. A problem, however, was seen in the fact that the decorative coatings market was not supposed to accept two-pack products with a limited potlife for these applications.

An aqueous two-pack system which is curable by Michael addition under formation of carbon-carbon bonds has been disclosed in U.S. Pat. No. 5,567,761 A. Ambient-temperature-curable aqueous polymer systems are disclosed therein, comprising: (A) an acetoacetylated polymer; and (B) a polyacrylate containing at least two (meth)acrylate end groups, in the form of an aqueous solution, suspension, or emulsion, wherein said acetoacetylated polymer is a water-dispersible acetoacetylated acrylic resin obtained by solution copolymerisation of a mass fraction of from 10% to 60% of a (meth)acrylic monomer (M1) having the formula $$CH_2=C(R^1)-C(O)-O-R^2-O-C(O)-CH_2-C(O)-CH_3 \quad (M1),$$

wherein $R^1$ is —H or —CH$_3$ and $R^2$ is a linear or branched saturated C$_1$- to C$_4$-alkylene group, a mass fraction of from 1% to 15% of a carboxyl vinyl monomer (M2), and a mass fraction of from 25% to 89% of a copolymerisable vinyl monomer (M3) selected from the group consisting of C$_1$- to C$_4$-alkyl (meth)acrylate, and styrene. A further embodiment claimed in claim 10 is an ambient-temperature curable composition, comprising: (A) a compound containing at least two acetoacetate methylene groups; (B) a compound containing at least two acrylate alkene groups; (C) a compound containing at least two epoxy groups; and (D) a Michael reaction catalyst base. Systems are disclosed which comprise an acetoacetylated polymer (A) in the form of an acrylic water-dispersible resin or an acrylic latex, and a polyacrylate having at least two (meth)acrylate end groups. The acetoacetylated acrylic water-dispersible resins are made by copolymerisation of a monomer mixture comprising mass fractions of from 10% to 60% of an acetoacetylated (meth)acrylate monomer, from 1% to 15% of a hydrophilic vinyl monomer, and from 25% to 89% of other copolymerisable vinyl monomers, and the aceto-acetylated acrylic latices are made by emulsion polymerisation of these monomers as stated supra. The polyacrylate having at least two (meth)acrylate end groups used as crosslinker is preferably a NCO-free water dispersible urethane polyacrylate resin. They are prepared by a two-stage process wherein a water-dispersible NCO-terminated prepolymer is formed in the first stage by reacting an excess of a polyisocyanate with an hydrophilic NCO-reactive compound which can impart the desired water dispersibility and/or a further NCO-reactive compound other than the hydrophilic compound mentioned supra. The NCO-terminated prepolymer is then capped with (meth)acrylate functionality by reacting with a NCO-reactive (meth)acrylate in a second stage. Suitable catalysts used are bases having a $pK_a$ of from 12 to 14, such as 1,8-diazabicyclo[5,4,0]undecene-7 (DBU), 1,5-diazabicyclo[4,3,0]nonene-5 (DBN), 1,1,3,3-tetramethylguanidine (TMGD), 1,4-dihydropyridines, 2-allyl-N-alkyl imidazolines, tetra-t-butylammonium hydroxide, potassium methoxide, sodium hydroxide, and potassium hydroxide. Other possible crosslinkers are mentioned which include low molar mass poly-malonates useful as curing agents include trimethylolpropane tri(ethyl malonate) which can be prepared by transesterification of trimethylolpropane with diethyl malonate. High molar mass polymalonates include malonated polyesters obtained by condensation polymerisation of malonic acids with glycols and other dibasic acids.

Extension of potlife of Michael addition curable systems had been possible by using certain carboxylic acids as blocking agents for the basic catalysts, as described in EP 0 448 154 A1, but temperatures of at least 80° C. were needed for curing, in order to decompose the carboxylic acids used, or to remove them by distilling off the free acid, and thereby shift the equilibrium until all or most of the blocked catalysts were unblocked.

A breakthrough had been achieved with the introduction of a latent base catalyst which is a carbonate salt which decomposes upon drying under release of carbon dioxide to form a strong base, as disclosed in EP 2 556 108 B1. This chemistry has, however, only been applied to solvent based or bulk liquid resins.

A water-borne coating composition comprising a vinyl polymer having acetoacetate functional groups and a polyalkyleneimine as stabiliser against gelling, optionally, crosslinkers such as trimethylol propane tri(meth)acrylate, 1,6-hexanediol di(meth)acrylate, and allyl acrylate, together with an anionic surfactant which is added after polymerisation, has been described in WO 1999/014 278 A1, corresponding to U.S. Pat. No. 6,201,048 B1.

A main concern in low temperature curing systems is the mobility of the components which carry the groups responsible for the curing reaction. This mobility is restricted during the film formation and vitrification of the coating film during the first stage of crosslinking. Further crosslinking can be enhanced by keeping the reactive groups in near neighbourhood. This can be done, e.g., by including both kinds of reactive groups in the same emulsified droplet, or even in the same polymer chain. An extended potlife together with rapid curing after application is therefore desired.

OBJECT OF THE INVENTION

It has therefore been the object of the invention to provide a water-borne coating composition that has long potlife, and accelerated curing speed after application and initial film formation.

SUMMARY OF THE INVENTION

These requirements were fulfilled by providing combinations of Michael donor components and Michael acceptor components capable of being emulsified in water, aqueous coating compositions comprising these Michael donor components and Michael acceptor components, suitable means for emulsifying at least one of these components which include addition of an emulsifier, referred to as "external emulsification", to either or both of the Michael donor components and Michael acceptor components, and/or hydrophilic modification, referred to as "self-emulsification", of either or both of the Michael donor components and Michael acceptor components, suitable catalysts for facilitating the Michael addition reaction, and suitable additives, fillers, and auxiliaries for these coating compositions.

The Michael reaction is a nucleophilic addition of a carbanion (or another nucleophile) to an alpha,beta-unsaturated compound bearing electron-withdrawing groups, which unsaturated compound is referred to as Michael acceptor. A Michael donor component that forms the nucleophile by deprotonation in the context of the present invention, is an organic molecule which has at least one acidic C—H group which is a C—H group in activated methylene >$CH_2$ group with a carbon atom attached to two further atoms which are not hydrogen, and methine =CH groups with a carbon atom attached to three further atoms which are not hydrogen, where at least one of the substituents is an electronegative substituent stabilising the carbanion, such as carboxyl groups, carbonyl groups, nitro groups, and cyano groups.

The present invention therefore relates to a water dispersible self-emulsifying polymer US comprising Michael donor groups, which polymer US comprises incorporated moieties that have pending hydrophilic groups and/or hydrophilic groups which form part of the polymer chain, and which comprises in its polymer chain ester groups or urethane groups, or both, as parts of the repeating units, and further preferably has a number average molar mass of at least 500 g/mol, and wherein the Michael donor groups are acidic C—H groups from activated methylene and/or methine groups, the carbon atom of the acidic C—H group being attached to at least one electronegative substituent, or electron-withdrawing group, wherein the polymer US, comprises, on average, at least two acidic C—H groups per molecule, and wherein the specific amount of substance of acidic C—H groups in the polymer US is at least 0.5 mol/kg and wherein the amount of acidic C—H groups in the polymer US is derived in majority from malonate moieties.

According to the invention, an aqueous polymer dispersion is also provided wherein the dispersed polymer U comprises Michael donor groups, and is a self-emulsifying polymer US which comprises in its polymer chain ester groups or urethane groups, or both, as parts of the repeating units, and further preferably has a number average molar mass of at least 500 g/mol, and comprises incorporated moieties that have pending hydrophilic groups and/or hydrophilic groups which form part of the polymer chain, wherein the Michael donor groups are acidic C—H groups from activated methylene and/or methine groups, the carbon atom of the acidic C—H group being attached to at least one electronegative substituent, or electron-withdrawing group, such as carboxyl groups, carbonyl groups, and cyano groups, wherein the polymer US comprises, on average, at least two acidic C—H groups per molecule, and wherein the specific amount of substance of acidic C—H groups in the polymer US is at least 0.5 mol/kg and wherein the amount of acidic C—H groups in the polymer US is derived in majority from malonate moieties.

By polymer is understood in the present invention an oligomer or polymer comprising at least 2 repeating units, preferably at least 5 repeating units. A repeating unit, in the context of the present invention, is a part of a polymer whose repetition would produce at least a part of the complete polymer chain, except for the end groups, by linking the repeating units together successively along the polymer chain.

By aqueous polymer dispersion is understood in the present invention, a dispersion of a polymer, usually in the form of dispersed particles, in an aqueous phase. The aqueous polymer dispersion comprises preferably at least 10% by weight of water. The relative weight ratio of water to the solid polymer US in this dispersion being at least 10 weight % (wt %), preferably at least 15 wt % and more preferably at least 25 wt %. The relative ratio of water to the solid polymer US usually does not exceed 95 wt %, preferably does not exceed 75 wt %.

DETAILED DISCLOSURE OF THE PREFERRED EMBODIMENTS

The Michael Donor Component

In a first embodiment, the polymer US comprises, in its polymer chain, moieties derived from a monomeric, oligomeric, or polymeric hydroxy-functional component B having at least one acidic C—H group, and moieties derived from a monomeric, oligomeric, or polymeric component D which is either an acid-functional component Da, or an isocyanate-functional component Di. The polymer US comprises ester groups or urethane groups as repeating units, when using Da or Di as component D.

In a second embodiment, the polymer US comprises, in its polymer chain, moieties derived from an at least difunctional acid Ba having at least one acidic C—H group, and moieties derived from a monomeric, oligomeric, or polymeric hydroxyfunctional component Dh which is preferably a hydroxy-functional component Bh as explained infra. The polymer US comprises ester groups as repeating units, when using Bh as component D.

In the first embodiment, the polymer US can be made by reacting a hydroxy-functional component B having, on average, at least one acidic C—H group per molecule as Michael donor, and at least two hydroxyl groups per molecule, and an at least difunctional component D which is either an acid-functional component Da, or an isocyanate-functional component Di, that react with hydroxyl groups of component B by collective or consecutive or mixed reaction, under polyaddition to form a polyurethane, or under polycondensation to form a polyester.

In the second embodiment, the polymer US is preferably a polyester, where the additional reaction step with the acid-functional component Da is avoided. This polyester is preferably formed, especially by a transesterification process, from a component B0 which is an ester, preferably of an alkanol having from one to six, more preferably from one to four, carbon atoms, and an at least difunctional organic acid Ba as defined infra having at least one acidic C—H group, the carbon atom of which is attached to carbon atoms having electronegative substituents, such as carboxyl groups, carbonyl groups, and cyano groups, with a hydroxyfunctional component Dh which is preferably a hydroxy-functional component Bh as explained infra.

The alkanol is liberated in the transesterification process. Alternatively alkenol esters of Ba such as isopropenylester could be used in stead of alkanol esters, in which case an alkenol is released after transesterification as a ketone.

Oligomeric or Polymeric Michael Donor Constituents

The oligomeric or polymeric hydroxy-functional Michael donor component B having acidic C—H groups according to the first embodiment are preferably polyesters made from dibasic organic acids Ba having at least one acidic C—H group which is attached to a carbon atom having electronegative substituents, such as carboxyl groups, carbonyl groups, and cyano groups, more preferably selected from the group consisting of oligomeric esters or polyesters BM comprising malonate groups, according to formula —O—C(O)—CH$_2$—C(O)—O—, which can be synthesised, e.g., by transesterification of dialkyl malonates Bm with organic dihydroxy compounds Bh, which are preferably linear or branched aliphatic or cycloaliphatic diols, in the presence of transition metal catalysts, such as compounds of titanium, zirconium, tin, hafnium, antimony, and bismuth. Preferred acids Ba are malonic acid, alkylmalonic acids, acetylacetone dicarboxylic acid, an other beta-ketocarboxylic acids and beta-ketodicarboxylic acids. Single diols Bh, or mixtures of two or more than two diols can be used. Preferred are cycloaliphatic or branched aliphatic diols Bh having from five to fifteen carbon atoms, wherein at least one is preferably selected from the group consisting of neopentylglycol, 1,2-, 1,3- and 1,4-bishydroxymethyl-cyclohexane, 2-sec-butyl-2-methyl-propanediol-1,3, 2-butyl-2-ethyl-propanediol-1,3, 2-ethyl-propane-diol-1,3, 2-butyl-2-methyl-propanediol-1,3, 2,6-bishydroxymethyl-decahydronaphthalene, and the isomer mixture of TCD alcohol (tricyclodecanedimethanol or octahydro-4,7-methano-1H-indene-dimethanol, systematic name: 3(4),8(9)-dihydroxymethyl-tricyclo(5.2.1.02.6)decane, mixture of isomers).

Among the dialkyl malonates Bm, those having alkyl groups of from one to four carbon atoms are preferred, such as dimethylmalonate, diethylmalonate, di-n-propylmalonate, diisopropyl-malonate, di-n-butylmalonate, and diisobutylmalonate.

The hydroxy-functional Michael donor component B can also be selected from compounds B', which are polyols BA having acetoacetate groups or polyols BC having cyanaoacetate groups, e.g., a polyether polyol or a polyester polyol having repeating units derived from multifunctional hydroxy compounds B'h3 having at least three hydroxyl groups per molecule, and from three to ten carbon atoms, at least one of which having been reacted to form an ester of a beta-keto acid B'ak of formula —C(O)—CH$_2$—C(O)—OH, where a ketone group >C═O is bound to the alpha-carbon atom that is bound to the carboxylic acid group, preferably acetoacetic acid, or an ester of an aliphatic acid B'aw of formula —CH(EWG)-C(O)—OH, having an electron-withdrawing group other than a carbonyl group, bound to the alpha-carbon atom that is bound to the carboxylic acid group, preferably cyanoacetic acid, or can be polyamide polyols comprising groups derived from acetoacetamide, and mixtures of two or more of these. Preferred other electron-withdrawing groups are cyano groups, carbonyl groups, and nitro groups. As triols B'h3, the triols B21h as mentioned infra can preferably be used. It is also possible to use a polyesterpolyol or a polyetherpolyol having both hydroxyl end groups, and end groups which are esters of a monofunctional beta-keto acid B'ak, or of a monofunctional aliphatic acid B'aw, as mentioned supra. There must be, of course, at least one hydrogen atom bound to the alpha-carbon atom of the acid B'a. The diacid component Bs in the polyester polyol is an aliphatic or aromatic diacid having at least four, and not more than twelve carbon atoms, preferably selected from the group consisting of succinic acid, adipic acid, 1,2-, 1,3-, and 1,4-cyclohexanedicarboxylic acid, terephthalic acid, and isophthalic acid.

According to the second embodiment mentioned supra, preferred are polyesters BM comprising malonate groups, according to formula —O—C(O)—CH$_2$—C(O)—O—, which are prepared by a polycondensation directly from malonic acid or preferably, from alkyl esters of malonic acid Bm, with cycloaliphatic or branched aliphatic diols Bh having from five to fifteen carbon atoms, wherein at least one is preferably selected from the group consisting of neopentylglycol, 1,2-, 1,3- and 1,4-bishydroxymethylcyclohexane, 2-sec-butyl-2-methyl-propanediol-1,3, 2-butyl-2-ethyl-propanediol-1,3, 2-ethyl-propane-diol-1,3, 2-butyl-2-methyl-propanediol-1,3, 2,6-bishydroxymethyldecahydronaphthalene, and the isomer mixture of TCD alcohol (tricyclodecanedimethanol or octahydro-4,7-methano-1H-indene-dimethanol, systematic name: 3(4),8(9)-dihydroxymethyl-tricyclo(5.2.1.02.6)decane, mixture of isomers), which are used as without further chain extension by compounds Da or Di. It is also possible, in another preferred embodiment, to replace at least partly the aliphatic diols Bh by oligomeric or polymeric diols, such as polyalkyleneglycol diols having from two to six carbon atoms in the alkylene group, and also by polyester polyols or polycarbonate polyols which have preferably two hydroxyl groups per molecule.

In a preferred version of the first embodiment, the oligomeric esters or polyesters BM comprising malonate groups can be reacted with an isocyanate-functional component Di, optionally together with further hydroxy-functional components as detailed infra under "Optional Components in the Polymeric Michael Donor", to obtain a mixed polyester-polyurethane.

Monomeric Michael Donor Components

The Michael donor can also be selected from reaction products of a monomeric dihydroxy-functional component B2 having acidic C—H groups, selected from the group consisting of hydroxy-functional diesters B22 of one mole of a dibasic carboxylic acid B22a having C—H acidic hydrogen groups with two moles of at least dihydric aliphatic alcohols B22h, such as bis-2-hydroxyethylmalonate, and monoesters B21 of triols B21h which are esterified with C—H acidic monocarboxylic acids B21a, preferably triols B21h that have at least two hydroxymethyl groups bound to the same carbon atom, such as glycerol and trimethylolalkanes acetoacetic acid or cyanoacetic acid or their reactive derivatives, such as glycerol monoacetoacetate, trimethylolalkane monoacetoacetate or glycerol monocyanoacetate and trimethylolalkane monocyanoacetate where the trimethylolalkane may be trimethylolethane, trimethylol-propane, trimethylolbutane or trimethylolpentane, which triol B21h is first reacted with one mole of a ketone to form a ketal blocking two of the three hydroxyl groups, then esterified, and after esterification, the ketal is hydrolysed to yield the triol monoester B21, preferably, glycerol monoester or trimethylolalkane monoester. For use in the polymers US of the present invention, two molecules of these compounds B2 have to be reacted with at least one molecule a component D to form an oligomer or polymer.

Polyesters U'EE comprising malonic acid groups can be made via transesterification from dialkylmalonates or other reactive derivatives of malonic acid, optionally together with other difunctional acids or reactive derivatives therefrom, and organic compounds B22h2 having two hydroxyl groups in a molecule, or mixtures of more than one of such compounds. Polyesters U'EE comprising other moieties with acidic C—H groups can be made by polycondensation reaction of aliphatic dicarboxylic acids B22a having from four to forty, preferably six to thirty-six carbon atoms, preferably selected from the group consisting of adipic acid, an dimer fatty acids, or aromatic dicarboxylic acids having from eight to twelve carbon atoms, such as terephthalic acid, isophthalic acid, and 1,4-, 2,3-, and 2,6-naphthalene dicarboxylic acids, with monoesters B21 of triols B21h which are esterified with C—H acidic monocarboxylic acids B21a, preferably triols B21h that have at least two hydroxymethyl groups bound to the same carbon atom, such as glycerol and the trimethylolalkanes trimethylolethane, trimethylolpropane, trimethylolbutane and trimethylolpentane, with C—H acidic mono-carboxylic acids, preferably acetoacetic acid and cyanoacetic acid or their reactive derivatives, to form esters such as glycerol monoacetoacetate, trimethylolalkane monoacetoacetate or glycerol monocyanoacetate and trimethylolalkane monocyanoacetate where the trimethylolalkane may be trimethylolethane, trimethylolpropane, trimethylolbutane or trimethylolpentane, which triol B21h is first reacted with one mole of a ketone to form a ketal blocking two of the three hydroxyl groups, then esterified, and after esterification, the ketal is hydrolysed to yield the triol monoester B21, preferably, glycerol monoester or trimethylolalkane monoester.

For use in the polymer U'S, which is in this case a self-emulsified polyester U'SE, the polyester must also comprise hydrophilic moieties derived from additional monomers used in the polycondensation process, which are built into the polymer chain, or moieties that are attached to the polymer chain by reaction with the end groups of the polyester, i.e. either a hydroxyl group, or an acid group.

Other useful monomeric mono-hydroxy-functional components B1 having acidic C—H groups are monohydroxy esters of dihydric alcohols with acids having acidic C—H groups such as acetoacetic acid and cyanoacetic acid or monoalkylmalonates, e.g., 2-hydroxyethylaceto-acetate, 2-hydroxypropylacetoacetate, 2-hydroxyethylcyanoacetate and 2-hydroxyethyl-monoethyl-malonate, which hydroxyesters B1 can become end groups of a polymer chain. A reaction product of one molecule of D and two molecules of B1 can be used as oligomeric Michael donor component.

Self-Emulsifying Polymers US

The self-emulsifying polymer US differs from an externally emulsified polymer UE in that it has, additionally, as further constituents in the polymer chain, structural elements of compounds A that have hydroxyl groups as functional groups, and moieties which are hydrophilic, and can be nonionic if derived from compounds An, or anionic if derived from compounds Aa, or can have both anionic and nonionic substructures if derived from compounds Aan. These structural elements have pending hydrophilic groups as end groups or side chains, or hydrophilic groups which form part of the polymer chain. Compounds An1 have either only one hydroxyl group, designated as An11, whereby they can be located at the polymer chain end, to be a terminal hydrophilic entity, or they have two or more hydroxyl groups, designated as An12, which allows them to be built into the polymer chain, and form pendant hydrophilic moieties.

The hydroxy-functional hydrophilic component A is preferably selected from the group consisting of
  a component Aa which has at least one, preferably two, hydroxyl groups and an acid group, which is preferably sterically hindered,
  a component An1 which is a monoalkylether of a polyoxyalkylene glycol having from one to four carbon atoms in the alkyl group, and from two to four carbon atoms in the alkylene group which is linear or branched, preferably two carbon atoms in the alkylene group which is linear or branched, and where the polyoxyalkylene group is bound with the remaining hydroxyl group by an ether bond to
    a dihydric alcohol, to yield a monohydroxy-functional component An11, or an at least trihydric alcohol, preferably a trihydric alcohol, to yield a dihydroxy-functional, or higher functional component An12, a polyoxyalkylene glycol An2 having two hydroxyl groups, wherein the alkylene group is linear or branched and has from two to four carbon atoms in the alkylene group, preferably two carbon atoms in the alkylene group, and a mixture of at least two of Aa, An11, An12, and An2, preferably of Aa and An12.

In a further embodiment, in the case of the self-emulsifying polymer US being a polyurethane, it is also possible to introduce hydrophilic groups which comprise lateral polyoxyalkylene chains, by addition of polyoxyalkylene glycol monoethers An01, preferably monoalkyl polyethylene glycol, and using also trifunctional isocyanates Di3 in the synthesis of the self-emulsifying polyurethane where the amount of the Di3 has to be chosen to compensate for the presence of An01, viz., the amount of substance of Di3 should be approximately equal to the amount of substance of An01: n(Di3)≈n(An01), where approximately equal means that the ratio n(Di3)/n(An01) is: 0.7≤n(Di3)/n(An01)≤1.3.

Preferred nonionic hydrophilic moieties are derived from oligomeric or polymeric oxyalkylene ethers, wherein the alkylene groups have from two to four carbon atoms and are linear or branched, preferably they have two or three carbon atoms, or they are derived from copolymers having both oxyethylene and oxypropylene moieties, and most preferred, from homopolymers consisting of oxyethylene groups only. In the context of the present invention, such oligomers have up to ten repeating units, and such polymers have at least eleven repeating units. The nonionic hydrophilic group can form a part of the polymer chain, as in the case of, e.g., a polyoxyethylene diol having one hydroxyl group at each end of its chain, or it can be a pending group where there are at least two hydroxyl groups close together at one end of polyoxyethylene chain, and no other reactive hydroxyl group at the other end of the chain.

Such nonionic hydrophilic moieties can be introduced into the polymer by reaction of nonionic hydrophilic compounds An1 including both An11 and An12, or An2, collectively referred to as Anh, having hydroxyl groups as functional groups, or by reaction of nonionic hydrophilic compounds Anf having functional groups that react with hydroxyl groups to form ester bonds or urethane bonds in the polymer chain of US.

Preferred nonionic hydrophilic compounds An12 are dihydroxy-functional monoethers of trimethylolalkanes having from four to ten carbon atoms with monohydroxy-functional oligomeric or polymeric oxyalkylene alkyl ethers, where the alkyl group has preferably from one to four carbon atoms, and the alkylene groups have from two to four carbon atoms, preferably two to three, particularly preferred, two, or can be copolymers having oxyethylene and oxypropylene units, in random or block copolymer form. Particularly preferred are compounds An12 which are ethers of formula

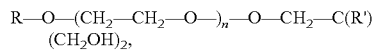
$(CH_2OH)_2$, where

R is an alkyl group preferably having from one to four carbon atoms, preferably selected from the group consisting of methyl, ethyl, n-propyl, iso-propyl, n-butyl, iso-butyl, sec-butyl and tert-butyl, particularly preferred, methyl, R' is H, or an alkyl group having from one to seven carbon atoms, preferably methyl, ethyl, n-propyl, and n-butyl, and n is an integer number of at least 5, preferably from 10 to 50.

The amount of An12 in the polymer US is preferably such that the amount of oxyalkylene, especially oxyethylene, in the overall polymer US is from 5 to 50 weight %, more preferably from 10 to 30 wt % and most preferred from 12 to 20 wt %.

The amount of An12 in the polymer US is preferably such that the amount of oxyalkylene, especially oxyethylene, in the overall polymer US is from 5 to 150 g per mol of acidic C—H group, more preferably from 10 to 100, and most preferred from 10 to 75 g per mol of acidic C—H group.

The use of these nonionic emulsifying moieties in the polyurethane allows to avoid introducing the hydroxycarboxylic or aminosulphonic acids usually used to make polyurethanes water-dispersible. It was also found that combinations of these non-ionic hydrophilic agents with the said hydroxycarboxylic or aminosulphonic acids Aa, particularly with bis-hydroxymethylpropionic acid, work well, and the amount of substance of such hydrophilic agents can be reduced if a mixture of non-ionic and anionic hydrophilisation is used.

It is also possible to introduce polyether polyols based on dihydroxypolyoxyalkyleneglycols which are linear or branched into the polymer chain. Particularly preferred are polyoxyethylene glycols having a molar mass from 500 g/mol to 4000 g/mol.

Preferred anionic hydrophilic moieties are those that have at least one anionic group, or at least one group that can be converted to an anionic group by salt formation (neutralisation), derived from compounds having anionic groups, or are able to form anionic groups when reacted with an alkaline substance. One further reactive group is needed in the compounds Aa to incorporate this moiety into the polymer, to form an end group, and two further reactive groups are needed for incorporation into the polymer chain in addition to those groups that are needed to incorporate these moieties into the polymer chain in a non-terminal position. The further reactive group is preferably a hydroxyl group, that can react with an acid-functional component Da to form an ester bond, or that can react with an isocyanate-functional group Di to form a urethane bond; or an amino group which may be primary or secondary, and that can react with an acid-functional component Da to form an amide bond, or that can react with an isocyanate-functional group Di to form a urea bond.

Preferred compounds Aa are therefore hydroxy acids Aha having one or preferably two hydroxyl groups, the acid group preferably being a carboxyl group —C(O)—OH, such as 2,2-bis-hydroxymethylacetic acid and its homologues, or a sulfonic acid group —S(O$_2$)—OH, and amino acids Aaa having one or two primary and/or secondary amino groups, such as 2-aminoethyl-2-aminoethane sulfonic acid.

These polymers US are preferably made from a hydroxy-functional component B having, on average, at least one acidic C—H group per molecule as Michael donor, and least two hydroxyl groups per molecule, and an at least difunctional component D that reacts with hydroxyl groups of component B, and additionally, from compounds A that can be incorporated into the polymer chain by reaction of their hydroxyl groups, in the case that hydroxy-functional compounds Ah are used, with functional groups of components D, or by reaction of functional groups that can react with hydroxyl groups of component B, in the case that compounds Af are used that can react with hydroxyl groups, by collective or consecutive or mixed reaction, under polyaddition or polycondensation.

A hydroxy-functional component A having at least one hydroxyl group and at least one hydrophilic group is incorporated into the polymer made from a polymeric hydroxy-functional component B having Michael donor groups as defined supra and a monomeric, oligomeric, or polymeric at least difunctional component D as defined supra that reacts with hydroxyl groups of component B by collective or consecutive or mixed reaction, under polyaddition or polycondensation. The hydroxy-functional component A can be a dihydroxy compound derived from a polyoxyalkylene which is hydrophilic, preferably polyoxyethylene and copolymers comprising oxyethylene and oxypropylene moieties, as block copolymers, or as random copolymers. Particularly preferred is a polyoxyethylene diol which can be incorporated into the polymer US by reaction of the terminal hydroxyl groups with component D during the polymer synthesis. A very efficient method for providing the needed hydrophilicity is the use of a reaction product Ay of a trimethylolalkane whereof only one hydroxyl group is part of an ether bond with a polyoxyethylene chain, the other terminal hydroxyl group of the polyoxyethylene chain being etherified preferably with a $C_1$- to $C_4$-alkyl group, and the remaining two hydroxyl groups of the trimethylolalkane which had been temporarily protected during the ethoxylation step serve to incorporate this compound Ay into the polymer chain. As trimethylolalkane, tris-hydroxymethyl-methane, 2,2-bishydroxymethylpropane-1-ol, 2,2-bishy-droxymethylbutane-1-ol, and 2,2-bishydroxymethyl-pentane-1-ol are preferably used. These hydrophilic modifiers Ay can be combined with the dihydroxy carboxylic acids Aa mentioned supra, wherein a synergy has been noted between these two types of hydrophilic agents.

It has been found that mixtures of anionic hydroxyfunctional compounds Aha and nonionic compounds Anh show synergistic behaviour, i.e., the sum of the masses of a mixture of Aha and Anh is lower than that of one component Aha or Anh alone to achieve the same desired hydrophilicity in the reaction. It was also found that by the reduction of the hydrophilicity of the coating film produced from such combinations, the moisture resistance at room temperature and elevated temperature was improved.

Optional Components in the Polymeric Michael Donor

Optionally, moieties derived from further hydroxy-functional components B" can also present in the polymer chain of polymer US. These further hydroxy-functional components B" can be polymeric, such as polyesterdiols BE made from aliphatic or aromatic dicarboxylic acids BEa with organic dihydroxy compounds BEh, preferably linear or branched aliphatic, or cycloaliphatic diols, and polycarbonatediols BC made from reactive derivatives of carbonic acid including dialkyl carbonates, alkylene carbonates, and carbonyl halogenides with organic dihydroxy compounds BEh, preferably linear or branched aliphatic, or cycloaliphatic diols having from four to ten carbon atoms.

These additional moieties are incorporated by using, in the synthesis of the polymer US, further hydroxy-functional components B" which are preferably selected from low molar mass aliphatic linear, branched or cyclic dihydroxy compounds B"h having a molar mass not exceeding 600 g/mol, polycarbonatediols BC made from reactive derivatives of carbonic acid including dialkyl carbonates, alkylene carbonates, and carbonyl halogenides with organic dihydroxy compounds BEh, which are preferably linear or branched aliphatic, or cycloaliphatic diols having from four to ten carbon atoms, and/or polyesterdiols BE having a molar mass higher than 600 g/mol, made by polycondensation of aromatic or aliphatic linear, branched or cyclic dicarboxylic acids B"a or anhydrides thereof, and aliphatic linear, branched or cyclic dihydroxy compounds BEh, wherein the stoichiometry in the polycondensation reaction to prepare the polyesterdiols BE and the polycarbonate diols BC is chosen such that the amount of substance of hydroxyl groups is always larger than the amount of substance of carboxyl groups or carbonic acid groups, to ensure the formation of hydroxyl end groups.

The hydroxy-functional component B"h having at least two hydroxyl groups per molecule is preferably selected from the group consisting of aliphatic linear, branched or cyclic diols having at least two carbon atoms, and preferably not more than forty carbon atoms, preferably, ethylene glycol, 1,2- and 1,3-dihydroxypropane, 1,2-, 1,3- and 1,4-dihydroxybutane, 1,5-dihydroxy-pentane, neopentylglycol, 1,6-dihydroxyhexane, 3-methylpentane-1,5-diol, 1,2- and 1,8-dihydroxyoctane, 2,2,4-trimethylpentane-1,3-diol, 1,2- and 1,12-dodecanediol, 1,2- and 1,-16-hexadecanediol, 1,2- and 1,18-octadecanediol, and dimer diols made from dimerised fatty acids by hydrogenation.

General Considerations for the Polymeric Michael Donor

The specific amount of substance of acidic C—H groups in the polymer US is usually at least 1 or even at least 1.8 mol/kg. The specific amount of substance of acidic C—H groups in the polymer US is preferably at least 1.2, more preferably at least 1.4, most preferably at least 2.0 and even more preferably at least 2.5 mol/kg. The amount of acidic C—H groups in the polymer US is preferably derived in majority from malonate moieties. The specific amount of substance of acidic C—H groups in the polymer US provided from malonate moieties is preferably at least 0.5, more preferably at least 1.0, most preferably at least 1.5 and even more preferably at least 1.9 mol/kg.

The specific amount of substance of acidic C—H groups in the polymer US does preferably not exceed 12.5, more preferably not 10.0 mol/kg.

The polymer US more preferably has a number average molar mass of at least 700, most preferably of at least 1400 g/mol. The molar mass of polymer US usually does not exceed 5000 g/mol.

The polymer US more preferably has a mass average molar mass of at least 2000 g/mol. The mass average molar mass of polymer US usually does not exceed 20000 g/mol.

The polymer US is preferably a polyester UE which is self-emulsified (UES), having ester groups —C—O—C(O)—C— in the polymer chain, which ester groups can be formed in a polycondensation reaction from polymeric hydroxy-functional compounds B having at least two hydroxyl groups per molecule, and from acid-functional compounds Da having at least two acid groups per molecule, or at least one acid anhydride group per molecule, which acid groups are preferably carboxylic acid groups —C(O)—OH, or in a polycondensation reaction from compounds Bb having at least one hydroxyl group per molecule and at least one carboxylic acid group per molecule. The polymer US is preferably a polyester UE which is self-emulsified (UES), with ester groups formed in a transesterification reaction from alkyl esters of malonic acid Bm with a hydroxyfunctional component Dh, which is preferably a polyester polyol and/or, more preferably, one or more cycloaliphatic or branched aliphatic diols Bh having from five to fifteen carbon atoms, wherein at least one is most preferably selected from the group consisting of neopentylglycol, 1,2-, 1,3- and 1,4-bishydroxymethylcyclohexane, 2-sec-butyl-2- methyl-propanediol-1,3, 2-butyl-2-ethyl-propanediol-1,3, 2-ethyl-propane-diol-1,3, 2-butyl-2-methyl-propanediol-1,3, 2,6-bishydroxymethyldecahydronaphthalene, and the isomer mixture of TCD alcohol (tricyclodecanedimethanol or octahydro-4,7-methano-1H-indene-dimethanol, systematic name: 3(4),8(9)-dihydroxymethyl-tricyclo(5.2.1.02.6)decane, mixture of isomers).

Another, more preferred, polymer US is a polyurethane UU which is self-emulsified (UUS), having urethane groups —C—N(H)—C(O)—O—C— in the polymer chain, which urethane groups are formed in a polyaddition reaction from hydroxy-functional polymeric compounds B having at least two hydroxyl groups per molecule, and from isocyanate-functional compounds Di having at least two isocyanate groups per molecule. Useful Michael donor groups are derived from malonic acid, from acetoacetic acid, from cyanoacetic acid, and from acetamido compounds. At least difunctional constituents are needed for polymerisation, more than two reactive groups per molecule of the binder composition are needed for crosslinking of the coating film. A balance must be found between the needed degree of crosslinking for hardness and chemical and solvent resistance, and avoiding brittleness of the film due to a too high degree of crosslinking.

As mentioned supra, the use of Da and Di in a two-step reaction is also a preferred embodiment, preferably first building a hydroxy-functional polyester using Da to attach hydroxy-functional molecules B, alone or together with one or more of the optional components, to each other, which polyester is then reacted, alone or together with one or more of the optional components, with Di under formation of a polyester-urethane.

With preference, Da is a reactive derivative of a dibasic acid that is able to react with the oligomeric or polymeric hydroxy-functional component B, and optionally, also with compounds A that are hydroxy-functional and are hydrophilic, as used in the synthesis of the self-emulsifying polymers US. As the use of acid anhydrides would generate acid groups, it is preferred in this case to use other reactive derivatives of acids, particularly isopropenyl esters or esters of other enols, which are split off as isopropenol molecules which immediately convert to their tautomeric form, acetone, which can be removed by distillation. In this way, no acid groups are generated which would interfere with the basic catalysis of the Michael reaction.

The compounds Di are preferably diisocyanates which are well known for formation of polyurethanes. Commonly used diisocyanates are the aliphatic isocyanates having from four to twenty carbon atoms, preferably, 1,4-diisocyanatobutane, 1,6-diisocyanatohexane, cycloaliphatic diiso-cyanates such as isophorone diisocyanate, 1,4-cyclohexane diisocyanate, bis-(4-isocyanato-hexyl)methane, and aromatic diisocyanates such as tetramethylxylylenediisocyanate, toluene diisocyanate and bis-(4-isocyanatophenyl)methane. It is also possible to use trifunctional or higher functional isocyanates Di3, alone, or in combination with difunctional diisocyanates Di2, if only low molar mass compounds are synthesised this way, in an amount that does not lead to danger of gel formation and premature crosslinking, the amount having to be found by experiments for each individual case.

With preference, the polymeric hydroxy-functional component B used for the synthesis of polymers US, especially for those containing urethane groups, is selected from the group consisting of a polyesterpolyol B1 comprising malonate moieties, calculated as —CO—CH$_2$—CO— with a molar mass of 70.05 g/mol, in a mass fraction of at least 7%, more preferably at least 15%, a polyether polyol B21 or a polyester polyol B22 having repeating units derived from multifunctional hydroxy compounds B3 having at least three hydroxyl groups per molecule, at least one of which having been reacted to form an ester of a beta-keto acid, preferably acetoacetic acid, or an ester of an aliphatic acid having an electron-withdrawing group in beta-position to the carboxylic acid group, preferably cyanoacetic acid, a polyamide polyol B4 comprising groups derived from acetoacetamide, and mixtures of two or more of B1, B21, B22, and B4.

Generally as an alternative to petrochemical based monomers the use of biobased monomers is also preferable. Isosorbide or other dianhydrohexitoles can preferably be used as hydroxy-functional component for the synthesis of polyester. Dimer fatty acids can preferably be used as a dicarboxylic acids for the synthesis of polyester. Dimer diols made from dimerised fatty acids by hydrogenation can preferably be used for the synthesis of polyester. Instead of petrochemical based dialkylmalonate preferably biobased grades of dialkylmalonate can be used that is prepared through a microbial process using acid-tolerant yeasts, starting from sugar and $CO_2$.

According to a first preferred variant of the invention, the polymers US comprising Michael donor groups are self-emulsifying polymers US comprising urethane groups as repeating units, moieties derived from a hydroxy-functional component A having at least one hydrophilic group, and containing a specific amount of substance of acidic C—H groups of at least 0.5 mol/kg, derived from malonate moieties. Those preferred polymers preferably also contain ester groups as repeating units. The hydroxy-functional component A is preferably selected from components An12, optionally in the presence of one or more component Aa, as described here above.

In this variant, the specific amount of acidic C—H groups is more preferably of at least 1.2 mol/kg, most preferably at least 2.0 mol/kg. The acidic C—H groups are preferably derived from malonate moieties.

Those preferred polymers are preferably obtained by reacting a hydroxy-functional component B having acidic C—H groups that is a polyester polyol, more preferably a polyester BM, with a hydroxy-functional component A and a isocyanate-functional compound Di as described here above, and optionally with one or more further hydroxy-functional components B" as described here above, in particular with low molar mass dihydroxy compounds B"h and/or polycarbonatediols BC and/or polyesterdiols BE.

It is also possible to incorporate, at least partially the component A into the hydroxy-functional component B.

The polyester polyol used as hydroxy-functional component B having acidic C—H groups in this first variant of the invention is preferably a polyester polyol having a glass transition temperature Tg of at least −50° C., more preferably at least −25° C., more preferably at least 0° C.

The polymers US comprising Michael donor groups and urethane groups as repeating units according to this first variant of the invention preferably has a mass average molar mass of at least 5000, preferably at least 8000 g/mol. The mass average molar mass does preferably not exceed 15000, more preferably not 12000, g/mol.

The amount of An12 in this polymer US of this first variant is preferably such that the amount of oxyalkylene, especially oxyethylene, in the overall polymer US is from 5 to 50 weight %, more preferably from 10 to 30 wt % and most preferred from 12 to 20 wt %. The amount of An12 in this polymer US is preferably such that the amount of oxyalkylene, especially oxyethylene, in the overall polymer US is from 5 to 150 g per mol of acidic C—H group, more preferably from 10 to 100, and most preferred from 10 to 75 g per mol of acidic C—H group.

According to a second preferred variant of the inventions, the polymers US comprising Michael donor groups are self-emulsifying polymers US comprising ester groups as repeating units, moieties derived from a hydroxy-functional component A having at least one hydrophilic group, and containing a specific amount of substance of acidic C—H groups of at least 0.5 mol/kg, derived from malonate moieties. The hydroxy-functional component A is preferably selected from components An12, optionally in the presence of one or more component Aa, as described here above.

Those preferred polymers are preferably obtained by reacting an alkyl ester of malonic acid Bm, as described here above, with a hydroxy-functional component A and one or more further hydroxy-functional components Dh, and optionally one or more hydroxyfunctional components B" as described here above, in particular with low molar mass dihydroxy compounds B"h.

Particularly preferred are dialkyl malonates Bm, especially those having alkyl groups of from one to four carbon atoms, such as dimethylmalonate, diethylmalonate, di-n-propylmalonate, diisopropyl-malonate, di-n-butylmalonate, and diisobutylmalonate.

In this variant, the specific amount of acidic C—H groups in the polymer US is more preferably of at least 2.0 mol/kg, most preferably at least 5.0 mol/kg. The acidic C—H groups are preferably derived from malonate moieties.

In this variant, preferred components Dh are polyesterpolyols and/or cycloaliphatic or branched aliphatic diols Bh; particularly preferred components Dh are cycloaliphatic or branched aliphatic diols Bh having from five to fifteen carbon atoms, wherein at least one is preferably selected from the group consisting of neopentylglycol, 1,2-, 1,3- and 1,4-bishydroxymethylcyclohexane, 2-sec-butyl-2-methyl-propanediol-1,3, 2-butyl-2-ethyl-propanediol-1,3, 2-ethyl-propane-diol-1,3, 2-butyl-2-methyl-propanediol-1,3, 2,6-bishydroxymethyldecahydronaphthalene, and the isomer mixture of TCD alcohol (tricyclodecanedimethanol or octahydro-4,7-methano-1H-indene-dimethanol, systematic name: 3(4),8(9)-dihydroxymethyl-tricyclo(5.2.1.02.6)decane, mixture of isomers).

Those preferred polymers can also be obtained by reacting an alkyl ester of malonic acid Bm, as described here above, with a polyester polyol which comprises said hydroxy-functional component A and is obtained by reacting said component A with one or more acid-functional compounds having at least two acid groups per molecule, or at least one acid anhydride group per molecule, which acid groups are preferably carboxylic acid groups —C(O)—OH, and optionally one or more hydroxyfunctional components B" as described here above, in particular with low molar mass dihydroxy compounds B"h. The acid functional compound is preferably an aliphatic or aromatic diacid or anhydride having at least four, and not more than twelve carbon atoms, more preferably selected from the group consisting of succinic acid, adipic acid, 1,2-, 1,3-, and 1,4-cyclohexanedicarboxylic acid, terephthalic acid, isophthalic acid, hexahydrophthalic acid or anhydrides thereof.

The polymers US comprising Michael donor groups and ester groups as repeating units according to this second variant of the invention preferably has a mass average molar mass of at least 1500, preferably at least 2000 g/mol. The mass average molar mass does preferably not exceed 7500, more preferably not 5000, g/mol.

The amount of An12 in this polymer US of this second variant is preferably such that the amount of oxyalkylene, especially oxyethylene, in the overall polymer US is from 5 to 50 weight %, more preferably from 10 to 30 wt %. The amount of An12 in this polymer US is preferably such that the amount of oxyalkylene, especially oxyethylene, in the overall polymer US is from 5 to 150 g per mol of acidic C—H group, more preferably from 10 to 100, and most preferred from 10 to 75 g per mol of acidic C—H group.

The self-emulsifying polymer US according to the invention may be dispersed in water.

The aqueous polymer dispersion according to the invention is obtained by dispersing one or more self-emulsifying polymer US according to the invention in water, optionally containing one or more other components.

The Michael Acceptor

In a coating composition, the said self-emulsifying polymer US comprising Michael donor groups or aqueous polymer dispersion of polymer US is combined with a second component hereinafter referred to as "Michael acceptor" MA which is at least one organic compound having at least two activated olefinically unsaturated groups of formula

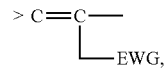

where

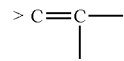

is one of the olefinically unsaturated groups, and "EWG" stands for "Electron-Withdrawing Group".

The Michael acceptor can be a monomeric, oligomeric or polymeric compound, and it is also possible, within the scope of the present invention, that the same polymer may carry both Michael donor groups and Michael acceptor groups.

In the present invention, the addition of Michael acceptor groups, can be done by adding Michael acceptor groups that are chemically bound to the backbone of the polymer US, usually by using a further constituent E in the synthesis of the polymer US which has at least one, preferably two, hydroxyl groups, and at least one activated olefinically unsaturated group.

The addition of Michael acceptor groups can also be done by a carrier compound different from the polymer US carrying Michael acceptor groups, preferably to an oligomeric or polymeric carrier compound, which preferably is co-emulsified in the polymer dispersion of polymer US or blended therewith. The addition of Michael acceptor groups can be done by a combination of both, i.e. by adding Michael acceptor groups chemically bound to the backbone of the polymer US and Michael acceptor groups chemically bound to a carrier compound different from the polymer US.

Suitable components MA are therefore ethylenically unsaturated components in which the carbon-carbon double bond is activated by an EWG, which is preferably a carbonyl group, a carboxylic acid group, a cyano group, or a nitro group. Representative examples of such components are disclosed in U.S. Pat. No. 2,759,913 A, column 6, line 35, to column 7, line 45, DE 835 809 B, column 3, lines 16 to 41, U.S. Pat. No. 4,871,822 A, column 2, line 14, to column 4, line 14, U.S. Pat. No. 4,602,061 A, column 3, line 14, to column 4, line 14, U.S. Pat. No. 4,408,018 A, column 2, lines 19 to 68, and U.S. Pat. No. 4,217,396 A, column 1, line 60, to column 2, line 64. Among these, acrylates and maleates are preferred. Most preferably, the component MA is an unsaturated acryloyl functional component. A first preferred group of suitable components MA are acrylic esters of hydroxyfunctional compounds having from 2 to 6 hydroxyl groups and from one to twenty carbon atoms. These esters may optionally contain hydroxyl groups. Especially preferred examples include hexanediol diacrylate, trimethylol propane triacrylate, pentaerythritol triacrylate, and di-trimethylolpropane tetraacrylate.

A further preferred group of compounds are polyesters based on maleic, fumaric and/or itaconic acid, and anhydrides thereof if they exist, and on divalent or polyvalent hydroxyl compounds, optionally also including minor amounts of monovalent hydroxyl and/or carboxyl compounds. Still further preferred group are polyesters, polyurethanes, polyethers and/or alkyd resins containing pendant activated unsaturated groups. These include, for example, urethane acrylates obtained by reaction of a polyisocyanate with an hydroxyl group-containing acrylic ester, e.g., an hydroxyalkyl ester of acrylic acid or a component prepared by esterification of a polyhydroxyl component with less than a stoichiometric amount of acrylic acid; polyether acrylates obtained by esterification of an hydroxyl group-containing polyether with acrylic acid; polyfunctional acrylates obtained by reaction of an hydroxyalkyl acrylate with a polycarboxylic acid and/or a polyamino resin; polyacrylates obtained by reaction of acrylic acid with an epoxy resin; and polyalkylmaleates obtained by reaction of a monoalkylmaleate ester with an epoxy resin and/or an hydroxy functional oligomer or polymer.

Most preferred activated unsaturated group-containing components MA are acryloyl functional compounds. It is also especially preferred that the acid value of the activated unsaturated group-containing components is sufficiently low to not substantially impair the activity of the catalyst, preferably less than about 20 mg/g, and most preferably less than 15 mg/g. These and other activated unsaturated group-containing compounds and their methods of production are generally known to those skilled in the art.

Preferably, the functionality, i.e. the number of activated olefinically unsaturated groups in one molecule, is from two to twenty. The number average molar mass $M_n$ of the compounds MA is preferably between 200 g/mol and 5000 g/mol. The specific amount of substance of olefinically unsaturated groups in the compounds MA is preferably from 0.5 mol/kg to 12 mol/kg, corresponding to an "equivalent weight" which is the ratio of the number average molar mass and the number of reactive functional groups per molecule, of from 80 g/mol to 2000 g/mol.

Useful Michael acceptors are at least difunctional olefinically unsaturated compounds with carbon-carbon double bonds that are activated by electron-withdrawing groups. Esters of olefinically unsaturated carboxylic acids with multifunctional alcohols which are optionally alkoxylated, or oligomeric compounds comprising esters of olefinically unsaturated carboxylic acids are preferred, particularly esters of acrylic acid. The Michael acceptor which has preferably acryloyl functions as functional moieties can be introduced into the polyurethane by adding esters of multivalent alcohols that are not fully esterified with olefinically unsaturated carboxylic acids, particularly acrylic acid, to an isocyanate functional polyurethane prepolymer. Examples of such partial esters are hydroxyethyl acrylate, penterythritol triacrylate, and dipentaerythritolpentaacrylate, or acrylic esters from alkoxylated multivalent alcohols, which lead to concentration of the Michael acceptor groups at the chain end(s) if monohydroxy compounds are used. Further Michael acceptor can be introduced to polymer US by adding reaction products of glycidylethers and olefinically unsaturated carboxylic acids. Preferably these Michael Acceptor compounds contain more than one hydroxy group and are therefore reacted into polymer US along the main chain. Most preferably bisphenol a diglycidyl ether diacrylate is used.

Another embodiment comprises addition of resinous compounds having Michael acceptor groups, also preferably acryloyl groups. These include polyurethanes that comprise acryloyl groups, which generally are compatible with the polyurethanes according to this invention which have acidic C—H groups. It is also possible to add oligomeric compounds having acryloyl functional groups, particularly those that are based on reaction products of partially acrylated multivalent alcohols, which may also be alkoxylated before esterification with acrylic acid.

In another preferred embodiment, Michael acceptor groups are chemically bound to a carrier compound different from the polymer US, preferably to an oligomeric or polymeric ether or urethane compound such as a polyhydroxypolyether or a polyhydroxy urethane, which is co-emulsified in the dispersion of polymer US or blended therewith. In a still further preferred embodiment, both carrier molecules having Michael acceptor groups, and polymers US having Michael acceptor groups chemically bound to their backbone can be combined in a binder dispersion. These systems can be prepared by adding, during the synthesis of polymer US, a mixture of a fully esterified polyhydroxy compound, and a partially esterified polyhydroxy compound, where esterification is effected by an olefinically unsaturated carboxylic acid, preferably acrylic acid. Such mixtures are also available commercially, e.g., mixtures of pentaerythritol triacrylate and pentaerythritol tetraacrylate.

Particularly suitable Michael acceptor compounds MA in the present invention are water-based energy curable compositions, especially water-dispersible urethane acrylates. Such components can be prepared from the reaction of (1) at least one polyisocyanate; (2) at least one hydrophilic compound containing at least one reactive group capable to react with isocyanate groups and making the polymer dispersible in water; (3) at least one compound containing at least one reactive group capable to react with isocyanate groups and at least one ethylenically unsaturated group; (4) optionally at least one polyol like (4a) an aliphatic, cycloaliphatic or aromatic polyol, (4b) a polyester polyol, (4c) a polyether polyol, (4d) a polycarbonate polyol (4e) a polyacrylic polyol, (4f) a polyvinyl polyol (4g) a polysiloxane polyol; (5) optionally, at least one chain capper or extender containing at least one primary or secondary amine function capable to react with isocyanate groups. The water-dispersible urethane acrylate polymer is typically obtained by a multiple-step process operating with or without solvent and from moderate to high temperature (35 to 100° C.) taking into account the desired polymer architecture and the subsequent reactant stoichiometry (namely isocyanate/hydroxyl and amine ratios); the control of allophanates and biurets formation at higher temperature can be used to increase the molecular weight and the branching of the polymer. The reaction typically proceeds with usual polymerization aids including catalysts and radical inhibitors; typically the compositions are free of tin. In the case a process solvent is used, it can be stripped out of the product after dispersion in water at a moderate temperature (40-60° C.) and under vacuum.

It is desirable that the water-based dispersion of the urethane acrylate is containing a limited amount of acidic protons hindering the action of the latent base catalyst capable to generate the malonate salt and induce thermal crosslinking. Nonionic polymer stabilization is therefore preferred but can be advantageously balanced with a partial anionic polymer stabilization providing that the acidic form is minor over its conjugated base. The level of the anionic stabilization can be reduced in the case that the polymer contains non-ionic water-solubilizing groups. The hydrophilic compounds (2) containing at least one reactive group capable to react with isocyanate groups and making the polymer dispersible in water are preferably constituted from both anionic and nonionic species that ensure an optimal particle size of the polymer dispersion and a good colloidal stability. A full nonionic polymer stabilization is however possible. Neutralizing agents that may be required for converting acidic groups built in the polymer into a salt are either volatile organic bases (like triethylamine) or non-volatile inorganic bases (like sodium hydroxide); the latter has the particularity to stay attached to the polymer all over film formation and thereafter. The resulting anionic functionality, present in the form of a carboxylate salt, a sulfonate salt or a phosphonate salt, is usually between 0-40 mgKOH/g, preferably between 2-20 mgKOH/g, more preferably between 4-10 mgKOH/g, the most preferably between 6-8 mgKOH/g. The nonionic functionality, preferably present in the form of a polyalkyleneoxide segment, is usually between 0-30% expressed as the weight fraction on the total polymer constituents, preferably between 6-18%; more preferably between 8-16%, the most preferably between 10-14%. The polyalkyleneoxide can be a homopolymer or a copolymer, either random or block, with a molecular weight between 200-20,000 Daltons, preferably between 500-5,000 Daltons, more preferably between 500-2,500 Daltons, most preferably between 500-1,500 Daltons; the polyalkyleneoxide is preferably polyethyleneoxide with a molecular weight between 500-1,500 Daltons. The polyethyleneoxide is preferably used as a 1,3-diol capable to orient its hydrophilic moiety as a pendant chain of the main polyurethane chain—in opposition to telechelic polyethyleneoxide diols or their equivalent polyester diols, polycarbonate diols or other associated polymers. In particular, the weight ratio between the alpha-(2,2-bis(hydroxymethyl) butyl)-omega-methoxy-poly(oxy-1,2-ethanediyl) monomer, known as YMER® N120 (Perstorp), and the dimethylolpropionic acid is usually fixed between 1:0 and 0:1, preferably between 5:1 and 15:1, most preferably between 8:1 and 12:1, the most preferably at 9:1. The nonionic and anionic polymer stabilization can be present on the same polymer or in separate polymers; this construction has the advantage to control and limit the viscosity increase of the final dispersion as a function of pH. The urethane acrylate polymer of the invention is further characterized by a level of (meth) acrylated functionality above 1 meg/g, preferably above 2 meq/g, more preferably above 3 meq/g, most preferably above 4 meq/g, the most preferably above 5 meq/g.

It is desired that the final dispersion composition of the urethane acrylate, in the frame of the invention, presents a pH above 7, preferably above 8, most preferably above 9, the most preferably above 10. The viscosity of this final dispersion is usually below 20,000 mPa·s, preferably below 2,000 mPa·s, more preferably below 1,000 mPa·s, most preferably below 500 mPa·s and the most preferably below 200 mPa·s.

In a preferred embodiment of the invention, Michael acceptor structures are built into the polymer US which comprises Michael donor groups. This can be effected by addition of a component E which is a single compound, or a mixture of compounds which are monomeric, dimeric or oligomeric hydroxy-functional compounds which can also be alkoxylated (ethoxylated or propoxylated, or with mixed oxyalkylation), and which are not fully esterified with olefinically unsaturated carboxylic acids, preferably, acrylic acid, i.e., they have still hydroxyl groups which are not esterified. These compounds are also commercially available, also as mixtures with fully esterified compounds, and include compounds such as ditrimethylolpropane triacrylate or pentaerythritol triacrylate. These compounds usually have on average only one hydroxyl group per molecule, and are therefore chain stoppers during the polyaddition or polycondensation reaction to form polymer US. Further Michael acceptor components E can be introduced to polymer US by adding reaction products of glycidylethers and olefinically unsaturated carboxylic acids. Preferably these Michael Acceptor compounds contain more than one hydroxy group and are therefore reacted into polymer US along the main chain. Most preferably bisphenol a diglycidyl ether diacrylate is used.

The invention also relates to a polymer U and an aqueous polymer dispersion of a polymer U comprising Michael donor groups and Michael acceptor groups. This polymer is preferably a self-emulsifying polymer US which comprises in its polymer chain incorporated moieties that have pending hydrophilic groups, and/or hydrophilic groups which form part of the polymer chain, and wherein the Michael donor groups are acidic C—H groups from activated methylene and/or methine groups, wherein the polymer US, comprises, on average, at least two acidic C—H groups per molecule, and wherein the specific amount of substance of acidic C—H groups in the polymer US is at least 0.5 mol/kg, preferably at least 1, more preferably at least 1.4, most preferably at least 1.8 and most preferably at least 2.5 mol/kg, and wherein the Michael acceptor groups are activated olefinically unsaturated groups, especially acryloyl groups.

In this embodiment according to the invention, the polymer U or US preferably comprises malonate groups. The polymer U or US preferably has all other features described here above in relation with a polymer US not containing Michael acceptor groups.

According to a third preferred variant of the invention, the polymers US comprising Michael donor groups are self-emulsifying polymers US comprising urethane groups as repeating units, moieties derived from a hydroxy-functional component A having at least one hydrophilic group, and containing a specific amount of substance of acidic C—H groups of at least 0.5 mol/kg, derived from malonate moieties, and Michael acceptor groups, in particular acrylic groups derived from compounds E as described here above. Those preferred polymers preferably also contain ester groups as repeating units. The hydroxy-functional component A is preferably selected from components An12, optionally in the presence of one or more component Aa, as described here above.

In this variant, the specific amount of acidic C—H groups is more preferably of at least 1.2 mol/kg, most preferably at least 2.0 mol/kg. The acidic C—H groups are preferably derived from malonate moieties.

Those preferred polymers are preferably obtained by reacting a hydroxy-functional component B having acidic C—H groups that is a polyester polyol, more preferably a polyester BM, with a hydroxy-functional component A, with a hydroxy-functional acrylate compound E and a isocyanate-functional compound Di as described here above, and optionally with one or more further hydroxy-functional components B" as described here above, in particular with low molar mass dihydroxy compounds B"h and/or polycarbonatediols BC. It is also possible to incorporate, at least partially the component A and/or hydroxy-functional acrylate compound E into the hydroxy-functional component B.

The polyester polyol used as hydroxy-functional component B having acidic C—H groups in this third variant of the invention is preferably a polyester polyol having a glass transition temperature Tg of at least −50° C., more preferably at least −25° C., more preferably at least 0° C.

The polymers US comprising Michael donor groups, Michael acceptor groups and urethane groups as repeating units according to this third variant of the invention preferably has a mass average molar mass of at least 5000, preferably at least 8000 g/mol. The mass average molar mass does preferably not exceed 15000, more preferably not 12000, g/mol.

The relative molar ratio of double bonds C=C provided by the Michael acceptor to the acidic C—H groups from the Michael donor in this polymer US is preferably from 10% to 250%, more preferably from 50 to 150%. In case the polymer is used in dual cure applications involving besides the curing by Michael addition reaction also an radiation curing, the relative amount is preferably from 75 to 250%. In case no radiation curing is involved, the relative amount is more preferably from 10 to 100%, most preferably from 20 to 90%.

According to a fourth preferred variant of the inventions, the polymers U comprising Michael donor groups are self-emulsifying polymers US comprising ester groups as repeating units, moieties derived from a hydroxy-functional component A having at least one hydrophilic group, and containing a specific amount of substance of acidic C—H groups of at least 0.5 mol/kg, derived from malonate moieties, and Michael acceptor groups derived from compounds E as described here above. The hydroxy-functional component A is preferably selected from components An12, optionally in the presence of one or more component Aa, as described here above.

Those preferred polymers are preferably obtained by reacting an alkyl ester of malonic acid Bm, as described here above, with a hydroxy-functional component A, with a hydroxy-functional compound E and one or more further hydroxy-functional components Dh, and optionally one or more hydroxyfunctional compounds B" as described here above, in particular with low molar mass dihydroxy compounds B"h.

Particularly preferred are dialkyl malonates Bm, especially those having alkyl groups of from one to four carbon atoms, such as dimethylmalonate, diethylmalonate, di-n-propylmalonate, diisopropyl-malonate, di-n-butylmalonate, and diisobutylmalonate.

In this variant, the specific amount of acidic C—H groups is more preferably of at least 2.0 mol/kg, most preferably at least 5.0 mol/kg. The acidic C—H groups are preferably derived from malonate moieties.

In this variant, preferred components Dh are polyesterpolyols and/or cycloaliphatic or branched aliphatic diols Bh; particularly preferred components Dh are cycloaliphatic or branched aliphatic diols Bh having from five to fifteen carbon atoms, wherein at least one is preferably selected from the group consisting of neopentylglycol, 1,2-, 1,3- and 1,4-bishydroxymethylcyclohexane, 2-sec-butyl-2-methyl-propanediol-1,3, 2-butyl-2-ethyl-propanediol-1,3, 2-ethyl-propane-diol-1,3, 2-butyl-2-methyl-propanediol-1,3, 2,6-bishydroxymethyldecahydronaphthalene, and the isomer mixture of TCD alcohol (tricyclodecanedimethanol or octahydro-4,7-methano-1H-indene-dimethanol, systematic name: 3(4),8(9)-dihydroxymethyl-tricyclo(5.2.1.02.6)decane, mixture of isomers), Those preferred polymers can also be obtained by reacting an alkyl ester of malonic acid Bin, as described here above, with a polyester polyol which comprises said hydroxy-functional component A and/or compound E, and is obtained by reacting said component A and/or compound E with one or more acid-functional compounds having at least two acid groups per molecule, or at least one acid anhydride group per molecule, which acid groups are preferably carboxylic acid groups —C(O)—OH, and optionally one or more hydroxyfunctional components B" as described here above, in particular with low molar mass dihydroxy compounds B"h. The acid functional compound is preferably an aliphatic or aromatic diacid or anhydride having at least four, and not more than twelve carbon atoms, more preferably selected from the group consisting of succinic acid, adipic acid, 1,2-, 1,3-, and 1,4-cyclohexanedicarboxylic acid, terephthalic acid, isophthalic acid, hexahydrophthalic acid or anhydrides thereof.

The polymer US comprising Michael donor groups, Michael acceptor groups and ester groups as repeating units according to this fourth variant of the invention preferably has a mass average molar mass of at least 1500, preferably at least 2000 g/mol. The mass average molar mass does preferably not exceed 7500, more preferably not 5000, g/mol.

The relative molar ratio of double bonds C=C provided by the Michael acceptor to the acidic C—H groups from the Michael donor in this polymer US is preferably from 10% to 250%, more preferably from 50 to 150%. In case the polymer is used in dual cure applications involving besides the curing by Michael addition reaction also an radiation curing, the relative amount is preferably from 75 to 250%. In case no radiation curing is involved, the relative amount is more preferably from 10 to 100%, most preferably from 20 to 90%.

The Catalyst

The water-borne coating composition further comprises a catalyst C to facilitate the Michael addition reaction. Useful catalysts are those described in EP 2 374 836 A1, where a substituted carbonate salt C1

is used as latent base catalyst, $X^+$ being a cation, where R is H (forming a hydrogen carbonate), or linear or branched alkyl from one to twenty carbon atoms, or aralkyl from seven to twenty-five carbon atoms, (both forming ester-carbonates), $M^+$ is an alkali cation, an earth alkali cation, an organic ammonium cation $R'_4N^+$, or an organic phosphonium cation $R''_4P^+$, where the groups R' and R" are linear or branched or cyclic alkyl groups having from one to ten carbon atoms, such as methyl, ethyl, isopropyl, n-butyl, 2-ethylhexyl, cyclohexyl, and stearyl, or aralkyl from seven to twenty-five carbon atoms, such as benzyl and phenethyl, and may be different from each other in one cation, such as methyltriethyl ammonium, trihexyl tetradecyl phosphonium, triisobutyl methyl phosphonium, and octadecyl trioctyl phosphonium.

Other basic catalysts that accelerate the reaction between Michael donor compounds and Michael acceptor compounds are compounds C2 which are salts of alkali metal cations or organic ammonium cations or organic phosphonium cations, and anions which are preferably carbanions derived from cyanoacetates such as ethylcyanoacetate ($pK_a$=9.0), 1,3-diketones such as acetylacetone ($pK_a$=8.95), 1,3-cyclohexanedione ($pK_a$=5.3), and 5,5-dimethyl-1,3-cyclohexanedione ($pK_a$=5.23), and nitroalkanes such as nitromethane ($pK_a$=10.2), nitroethane ($pK_a$=8.5), and 2-nitropropane ($pK_a$=9.98). These can preferably be combined with one or more optional components C2' which have one or more acidic Q-H groups wherein Q is selected from the group consisting of nitrogen, phosphorus, oxygen, sulfur, and carbon, the Q⁻ anion being a Michael addition donor reactable with a Michael acceptor, wherein the $pK_a$(C2') of the Q-H group in component C2' is more than two lower than the $pK_a$(MD) of the first proton of the Michael donor component and being lower than 10.5, and the ratio n(H, C2')/n(C⁻, C2) of the amount of substance of acidic Q-H groups in component C2' to the amount of substance of the carbanion in component C2 is between 0.01 and 50. C2' is preferably an organic amine compound having at least one >NH group where the $pK_a$ value (negative decadic logarithm of the ionisation constant $K_a$) for the reaction >N—H⇌>N⁻+H⁺ is between 4 and 14. These systems are disclosed in WO 2014/166880 A1. Among the preferred organic nitrogen compounds are succinimide, 1,2,4-triazole, and 1,2,3-benzotriazole.

A further catalyst system C3 for crosslinking by Michael addition using Michael donor and Michael acceptor under formation of C—C bonds has been disclosed in WO 2018/005 077 A1 which is a dormant carbamate initiator of formula

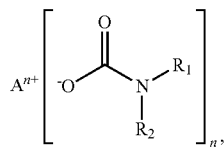

wherein n is an integer equal to, or greater than, one, and $A^{n+}$ is a cationic species or a polymer, with the proviso that $A^{n+}$ is not $H^+$, and optionally, further comprises ammonium carbamate, $H2R'^1R'^2N^{+-}O—(CO)NR'''^1R''^2$, wherein each $R^1$, $R^2$, $R'^1$, $R'^2$, $R'''^1$ and $R''^2$ is independently selected from the group consisting of a hydrogen atom, and a linear or branched, substituted or unsubstituted, alkyl group having from one to twenty-two carbon atoms. Mixtures of carbamate catalysts C3 and carbonate catalysts C1 which are also preferably used have been described in WO 2018/231 927 A1 and also in WO 2018/231 920 A1.

Preparation of a Paint Binder

The present invention also relates to an aqueous polymer dispersion and to an aqueous coating composition comprising at least one polymer US as described here above.

The aqueous polymer dispersion according to the invention preferably also contains Michael acceptor groups, wherein:

Michael acceptor groups are chemically bound to the backbone of the polymer US by using a further constituent E in the synthesis of the polymer US which has at least one, preferably two, hydroxyl groups, and at least one activated olefinically unsaturated group Michael acceptor groups are chemically bound to a carrier compound different from the polymer US, preferably to an oligomeric or polymeric carrier compound as described here above, which preferably is co-emulsified in the polymer dispersion or blended therewith, or Michael acceptor groups are chemically bound to the backbone of the polymer US and Michael acceptor groups are chemically bound to a carrier compound different from the polymer US.

Particularly suitable Michael acceptor carrier compounds are water-based energy curable compositions, especially water-dispersible urethane acrylates, as described here above.

The aqueous polymer dispersion according to the invention can be made by preparing a aqueous dispersion of one or more polymer US and blending therewith or co-emulsifying therein one or more Michael acceptor carrier compound or by blending an aqueous dispersion of one or more polymer US with an aqueous dispersion of one or more Michael acceptor carrier compound or by co-emulsifying or blending one or more polymer US with with an aqueous dispersion of one or more Michael acceptor carrier compound.

The present invention also relates to an aqueous coating composition comprising at least one polymer US as described here above, and at least one component comprising Michael acceptor groups, said component may be the same as polymer US if such polymer US comprises also Michael acceptor groups as described here above, and/or may be a component different from polymer US, and at least one catalyst as described here above.

In the coating composition of the invention, the Michael donor is a water-dispersible oligomer or polymer, or both the Michael donor and the Michael acceptor are water-dispersible oligomers or polymers, or both Michael donor groups and Michael acceptor groups are present in a water-dispersible oligomer or polymer.

In the coating composition, the aqueous dispersion of polymer US comprising Michael donor groups is mixed with the appropriate amount of a Michael acceptor component, taking into account if a Michael acceptor compounds has already been incorporated into the polymer US, or has been added thereto before or during dispersion, pigments, dyes, fillers, and additives such as antisettling agents, dispersants, defoamers, wetting agents, light and UV stabilisers, flow modifiers, adhesion promoting agents, coalescence agents, corrosion inhibitors, matting agents, and flame retardants are added, and the catalyst is added. The quantities of Michael donor and Michael acceptor are chosen in a way that the ratio n(C—H)/n(>C=C<) of the amount of substance n(C—H) of activated acidic protons C—H in the Michael donor component to the amount of substance n(>C=C<) of activated unsaturated groups >C=C< in the Michael acceptor component is between 10 mol/mol and 0.1 mol/mol, more preferably between 5 mol/mol and 0.2 mol/mol, even more preferably between 2 mol/mol and 0.5 mol/mol, and most preferably between 1.5 mol/mol and 0.8 mol/mol. In the Michael addition, in which the activated C—H group of the Michael donor, when deprotonated, adds to one of the carbon atoms of the activated olefinically unsaturated group of the Michael acceptor. The activated methylene (>CH₂) group can, in principle, be equivalent with two activated methine (=CH) groups. This is, however, only the case for those Michael donor/Michael acceptor combinations wherein both hydrogen atoms of the Michael donor component are reactive; for example in case of a system comprising malonate and acryloyl reactive groups, both hydrogen atoms of the methylene group in the malonate entity can react. In a Michael addition reaction with maleates, this is not the case: the second hydrogen atom of the methylene group is no longer reactive once one maleate molecule has been added.

It is also possible to use the coating compositions of the present invention in dual cure-applications, i.e. curing by both Michael addition and radiation curing, as the Michael acceptor components can also cure upon exposure to radiation. Suitable radiation types for the curing of the polymers according to the invention are UV light and electron beam. Typical suitable UV light sources emit light at wavelengths between 200 and 800 nm and emit at least some radiation in the range 200 to 400 nm. The source of the UV light can for instance be a UV light emitting diode (UV-LED). UV-LED typically emit in a spectrum with the strongest wavelength in the range of from 365 to 395 nm. The source of radiation can also be an Excimer lamp such as one from IOT GmbH at 172 nm. Another example of suitable source of UV light is a medium pressure Hg bulb. In the case of radiation by UV light, a photoinitiator is usually needed to form free radicals that initiate the polymerisation process during the photocuring reaction, while no additional photoinitiator is needed when using electron beams as radiation. The combination of these two curing reactions leads to faster formation of the cured coating film, and to higher hardness and better solvent resistance of the cured coating film. This dual cure technology also allows to reduce the amount of photoinitiator used in curing with UV light alone, and thus helps to reduce problems with yellowing of the coating films due to higher amounts of photoinitiator present in the coating film.

The coating composition of the present invention can also be blended with other organic binder resins in order to improve application parameters, i.e. open time, physical drying performance, adhesion, anti-corrosion performance, solids content. Particularly useful as such blending resins are the ones having a very low level of acidity which would interfere with the basic catalysis of the Michael reaction. Particularly useful are acrylic dispersion resins with an acid value of less than 10 mg/g (based on solid polymer). Further preferable blending resins are alkyd type resins that are emulsified with polymeric surfactants and that show an acid value of less than 10 mg/g (based on solid polymer). Emulsions of epoxy resins stabilized with nonionic surfactants are also particularly preferred. Further nonionic stabilized polyurethane dispersions or emulsions of oil-free polyesters can be used as blending resin.

The aqueous coating compositions according to the invention can be used in several applications, particularly as topcoat in marine, protective and industrial OEM market applications. For these applications, usual further components such as fillers, light stabilisers, flow and levelling additives, pigments, pigment wetting agents, antisettling agents, coalescence agents, and biocides can be added to the coating compositions. The coating compositions in accordance with the present invention are suitable for a variety of coatings uses, for example, as paint, impregnating, sealing and bonding compositions. A preferred application is as a primer, topcoat, basecoat, filler or clearcoat; the coating compositions may be applied to a substrate in any convenient manner such as, for example, by spraying, rolling, dipping, flooding, or brushing. The crosslinkable composition of the invention can be applied onto a wide range of substrates, such as metallic substrates including iron, steel, pretreated steel types such as electrocoated, zinc (galvanized), and phosphated steel, oxilan-pretreated steel, shot/grit-blasted steel, tinplate, aluminium substrates including chrome treated and non-chrome treated aluminium or alloys. The crosslinkable composition of the invention can also be applied on wooden substrates or wood composites, board, paper, cardboard, leather, synthetic material, glass and mineral substrates such as concrete, tiles, stone and plaster. Other materials suitable as substrates for the crosslinkable composition of the invention are heat sensitive substrates such as plastic substrates, especially ABS substrates, polycarbonate substrates, ABS/polycarbonate substrates, glass- and carbon-fiber reinforced plastics or composites, SMC (sheet molding compound) such a polyester and glass fiber combinations, especially those used in automotive applications, poly(ethylene terephthalate), poly(butylene terephthalate), polyamide-6, polyamide-6.6, (thermoplastic) polyolefins, poly(vinyl chloride), poly(methyl methacrylate) and polystyrene.

The crosslinkable composition of the invention can also be applied on coated substrates, including metal, plastic, mineral or wood substrates pretreated with e.g. sealer, primer, putty, water-borne or solvent-borne basecoat layers. Examples of suitable primer systems include two-component systems such as two-component solvent-borne or water-borne polyurethanes, aspartate, epoxy-amine, acetoacetate-ketimine and Real Michael Addition compositions or combinations/hybrids thereof, unsaturated polyester putties, one-component coatings such as (thermoplastic) polyacrylics, solvent- or water-borne polyurethanes, urethane acrylic polymers, carboxyl functionalized self-crosslinking acrylic polymer, cationic acrylic polymers or polyvinyl acetate.

The crosslinkable composition of the invention can furthermore be applied onto metal, wood or mineral substrates pretreated with adhesion-promoting substances such as (amino)silanes. The coating system may also be applied on multisubstrate assemblies composed of metal and/or plastic parts with various different pretreatments and/or coatings including those mentioned above. Curing of the above-described coating compositions is preferably carried out at temperatures above about 0° C., generally between about 5° C. and about 150° C., preferably at from 5° C. to 60° C., and most preferably between 5° C. and 30° C. (also comprising room temperature).

The present invention further relates to a coated substrate which has been coated with a coating composition comprising the aqueous dispersions comprising a polymer US or the coating compositions comprising the polymer US as described here above and wherein the coating composition has cured at a temperature above 0° C. and optionally, additionally, by exposure to radiation, and wherein the coating composition preferably contains a photoinitiator if UV light is chosen as source of radiation.

FURTHER USES

In addition to the use in coating compositions, combinations of catalysts C with dispersions of the polymer US comprising Michael donor groups, and further compounds comprising Michael acceptor groups, or combinations of catalysts C with dispersions of polymers US which further comprise Michael acceptor groups in this polymer can also be used as binder system in polymer concrete, together with the usual further concrete constituents which are commonly referred to as "construction aggregate" or simply "aggregate", and comprise coarse to medium sized particulate material including sand, gravel, crushed stone and crushed slag, and also recycled comminuted concrete, and extenders and fillers, such as fly ash, and rock flour.

Another preferred application is as a binder system for In-Mold Decoration (IMD) processes as described in EP2408605, WO9304837, US2019375139 or US2019381821 in which decorative films are placed into an injection mold and back-injected with a polymer melt. Particularly suitable is the application as a clearcoat for the process described in US2019381821 in which the decorative film is applied as a transfer film that must easily be removable from the clearcoat after molding.

Other preferred applications are as impregnating, sealing, and bonding compositions, for nail varnishes or the production of gel nails.

The polymer composition of the invention can further be used as a binder for inks, print receptive coatings and overprint varnishes. In addition to conventional application systems, digital printing (inkjet) and 3D printing can be used.

Advantages of the Present Invention

The main advantages that have been realised with the binder according to the invention are, i.a.,
no use of free isocyanates during application of the polymer
avoidance of organic solvents during formulation
very long potlife which reduces waste due to premature gelling of the coating composition
very fast cure at ambient temperature
very good hardness development in combination with a high ductility and flexibility of the coating film
very high chemical resistance due to a high crosslinking density
very high gloss, and good appearance
good UV resistance
no formation of blisters during curing (which is observed due to a side reaction of isocyanates with water in isocyanate-cured systems)
particularly malonate-based polymers show a lower propensity for discolouration in contact with metal ions as compared to acetoacetoxy based polymers, such as used in U.S. Pat. No. 5,567,761 A
possibility of dual curing by Michael addition and radiation curing with radiation, i.e. electron beam or UV light

EXAMPLES

The invention is further explained by the following examples.

In these examples, and also in the text of the disclosure, the following physico-chemical values are used:

the specific amount of substance $n_m(F)$ of a certain functional group F in a chemical compound B is calculated as the amount of substance n(F) of the said functional group, divided by the mass m(B) of the compound B under consideration (the mass of the solid or undiluted compound B in the case that a solution or dispersion of the said compound B is used). The appropriate SI unit is "mol/kg"; formerly, the reciprocal value of this quantity was also used, with the deprecated designation as "equivalent weight" with the unit "g/mol", the mass fraction $x_S$ of solids in a solution or dispersion is the ratio of the mass $m_S$ of (solid) solutes or dispersed material S, divided by the mass $m_L$ of the liquid solution or dispersion: $x_S = m_S/m_L$, with the SI unit of kg/kg=1, often stated with the unit "percent" as $x_S/\% = 100 \times m_S/m_L$, the "acid value", also referred to as "acid number", is the ratio $w_A$ of the mass mKoH of potassium hydroxide which is needed to neutralise a mass $m_B$ of an acid-functional organic substance B which has an amount of substance $n_{HA}$ of acidic hydrogen atoms, and the mass $m_B$: $w_A = m_{KOH}/m_B = (n_{HA} \times M_{KOH})/m_B = (n_{HA}/m_B) \times M_{KOH} = n_m(HA) \times M_{KOH}$, usually stated with the unit "mg/g", where $M_{KOH} = 56.105$ g/mol, $n_m(X) = n(X)/m$ standing for specific amount of substance which is the ratio of the amount of substance n(X) of a compound or entity X, and the mass m of the composition comprising this compound or entity X, the "OH-value" or "hydroxyl value", also referred to as "hydroxyl number", is the ratio $w_{OH}$ of the mass $m_{KOH}$ of potassium hydroxide which has the same amount of substance $n_{OH}$ of hydroxyl groups as a mass $m_B$ of a hydroxy-functional organic substance B, and the said mass $m_B$: $w_{OH} = m_{KOH}/m_B = n_{OH} \times M_{KOH}/m_B = n_m(OH) \times M_{KOH}$, usually stated with the unit "mg/g", where $M_{KOH} = 56.105$ g/mol the "amine value", also referred to as "amine number", is the ratio $w_{Am}$ of the mass $M_{KOH}$ of potassium hydroxide that needs the same amount of substance of an acid for neutralisation as a mass $m_B$ of an amine-functional organic substance B which has an amount of substance $n_{Am}$ of basic amino groups Am, and the said mass $m_B$: $w_{Am} = M_{KOH}/m_B = (n_{Am} \times M_{KOH})/m_B = (n_{Am}/m_B) \times M_{KOH} = n_m(Am) \times M_{KOH}$, usually stated with the unit "mg/g", where $M_{KOH} = 56.105$ g/mol, the mass fraction $w_{NCO}$ of isocyanate groups in a reaction mixture was calculated as the mass $m_{NCO}$ of isocyanate groups, —N═C═O, having a molar mass of $M_{NCO} = 42.017$ g/mol, divided by the mass mm of the reaction mixture RM, the dynamic viscosity η was determined in a cone-plate viscometer at 25° C. and a shear rate of 100 s$^{-1}$ if not stated otherwise, the particle size of a polymer dispersion is measured by dynamic light scattering, in a "Zetasizer" (Malvern Instruments Ltd.) and the particle size (z-average particle size) obtained is the diameter of a sphere that has the same translational diffusion coefficient as the particle being measured, the so-called "hydrodynamic diameter" and refers to the way a particle diffuses within a fluid, and the dispersity D is defined as the ratio of the quadratic average and the square of the arithmetic average, i.e. for a number of particles where particle i has a diameter di, the dispersity is $Đ = \Sigma(di^2)/(\Sigma d_i)^2$, where the sums are over all particles i.

the number average molar mass Mn and the mass average molar mass $M_m$ of a polymer is used as defined in the IUPAC recommendations 2008, these have been measured by gel permeation chromatography (GPC) on solutions of the polymer under consideration in tetrahydrofuran having a mass concentration of solute γ (Polymer)=1.5 g/L, wherein the elution rate was 1 mL/min, using columns for the appropriate molar mass range in each case, and calibration has been made as usual with polystyrene standards, the theoretical specific amount of substance n(CH)/m (Mdc) of CH-acidic hydrogen atoms in a Michael donor compound (Mdc) was calculated from the stoichiometry of the preparation reaction, where n(CH) is the amount of substance of acidic hydrogen atoms in activated methylene or methine groups in the Michael donor compound, and m(Mdc) is the mass of this Michael donor compound, the specific amount of substance of malonate groups —O—C(O)—CH$_2$—C(O)—O— in the Michael donor compounds, n(mal)/m(Mdc), the reciprocal of this value being the "malonate equivalent weight", was measured using the following procedure:

a sample was dissolved in (60±1) mL of dimethylformamide (DMF, dry, pro analysis grade) in an Erlenmeyer flask of 100 mL capacity, three drops of a solution of azo violet solution (4-(4-nitrophenylazo)-resorcinol, dissolved in o-xylene, mass fraction of solute 0.5%) was added, and the flask was immediately stoppered with a flexible sleeve stopper with an N$_2$ inlet tube and flushed with nitrogen during the whole measurement process to avoid CO$_2$ consumption, titration was done manually with a sodium methoxide solution (NaOCH$_3$ dissolved in methanol, pro analysis grade, mass fraction of solute 25%) from a syringe until a clear blue colour appears at the equivalence point. The amount of titrant solution was determined gravimetrically by weighing the complete syringe before and after addition. The titre of the sodium methoxide solution was determined indirectly by adding a specified amount to water, and by titration of the sodium hydroxide formed with an HCl solution with potentiometric indication. Diethylmalonate (DEM) has been applied as a reference.

and the following abbreviations have been used:

DBTL dibutyltin dilaurate
di-TMPA4 di-trimethylolpropane tetraacrylate
di-TMPA3 di-trimethylolpropane triacrylate, having a hydroxyl value of 136 mg/g, and a specific amount of substance of olefinically unsaturated groups of 7.30 mol/kg (corresponding to a "double bond equivalent weight" of 137 g/mol)
DPHA mixture of dipentaerythritol pentaacrylate and dipentaerythritol hexaacrylate
EOPO-PEA4 ethoxylated/propoxylated pentaerythritol tetraacrylate, wherein the ratio of oxyethylene units to oxypropylene units to pentaerythritol units is 4 mol:1 mol:1 mol, having a specific amount of substance of olefinically unsaturated groups of 6.82 mol/kg, corresponding to a "double bond equivalent weight" of 146.7 g/mol
EO-TMPTA tri-ethoxylated trimethylolpropane triacrylate having a specific amount of substance of olefinically unsaturated groups of 7.00 mol/kg, corresponding to a "double bond equivalent weight" of 142.8 g/mol
IPDI isophoronediisocyanate, 5-iso-cyanato-1-[isocyanatomethyl]-1,3,3-trimethyl-cyclohexane
MBTO monobutyltin oxide, n-C$_4$H$_9$—Sn(O)OH
PC-diol polycarbonate diol, Desmophen® C 2100, Covestro, WOH=108.9 mg/g corresponding to a specific amount of substance of hydroxyl groups of n$_m$(OH)=1.94 mol/kg
PETIA mixture of pentaerythritol triacrylate and pentaerythritol tetraacrylate, having a specific amount of substance of olefinically unsaturated groups of 10.1 mol/kg, and a hydroxyl number of 120 mg/g
TCD alcohol tricyclodecane dimethanol, 3(4),8(9)-dihydroxymethyl-tricyclo-(5.2.1.0$^{2,6}$)-decane, mixture of isomers
TMXDI meta-tetramethylxylylenediisocyanate, 1,3-bis-[1-isocyanato-1-methylethyl]-benzene
Ymer® N120 poly[oxy-1,2-ethanediyl], alpha-[2,2-bis [hydroxymethyl]butyl]-omega-methoxy-, hydroxyl value WOH=(110±10) mg/g, Perstorp AB Example 1a: Malonate Polyester Polyol 641 g of diethylmalonate, 980 g of TCD alcohol, and 0.35 g of MBTO were mixed and heated to 175° C. within two hours while ethanol was distilled off entirely. The reaction mixture was maintained at that temperature until a resin was obtained with a mass fraction of solids of 99.5% and an OH-value of 107 mg/g. The number average molar mass Mn (GPC at 25° C. and an elution rate of 1 ml/min, with a solution of the polyester polyol with a mass concentration of 1.5 g/L in tetrahydrofurane, and calibration with polystyrene standards) was 1145 g/mol. The glass transition temperature Tg of this polyester was 9° C. This polyester polyol comprises malonate moieties, calculated as —CO—CH$_2$—CO— (with a molar mass of 70.05 g/mol) in a mass fraction of 22.4%.

Example 1b: Malonate Polyester Polyol 961 g of diethylmalonate, 729 g of neopentylglycol and 0.35 g of MBTO were mixed and heated to 175° C. within two hours while ethanol was distilled off entirely. The reaction mixture was maintained at that temperature until a resin was obtained with a mass fraction of solids of 95.0% and an OH-value of 125 mg/g. The number average molar mass Mn calculated therefrom is 898 g/mol. The glass transition temperature Tg of this polyester was −37° C. This polyester polyol comprises malonate moieties, calculated as —CO—CH$_2$—CO— (with a molar mass of 70.05 g/mol) in a mass fraction of 36.9%.

Example 1c: Malonate Polyester Polyol 640.7 g Diethylmalonate, 801.3 g butylethylpropandiol and 0.35 g MBTO have been heated up to 175° C. within 2 hours while ethanol was distilled off entirely and further maintained at that temperature until a resin was built with a solids content of 93.5% and an OH-value of 130 mgKOH/g. The glass transition temperature of the polyester was −38° C. This polyester polyol comprises malonate moieties, calculated as —CO—CH$_2$—CO— with a molar mass of 70.05 g/mol, in a mass fraction of 26.1%.

Example 1d: Malonate Polyester Polyol 800.9 g Diethylmalonate, 865.3 g cyclohexane dimethanol and 0.35 g MBTO have been heated up to 175° C. within 2 hours while ethanol was distilled off entirely and further maintained at that temperature until a resin was built with a solids content of 97.4% and an OH-value of 123 mgKOH/g. The glass transition temperature of the polyester was −19° C. This polyester polyol comprises malonate moieties, calculated as —CO—CH$_2$—CO— with a molar mass of 70.05 g/mol, in a mass fraction of 29.0%.

Example 1e: Malonate Polyester Polyol 961.1 g Diethylmalonate, 827.4 g 1,6-hexanediol and 0.35 g MBTO have been heated up to 175° C. within 2 hours while ethanol was distilled off entirely and further maintained at that temperature until a resin was built with a solids content of 96.8% and an OH-value of 119 mgKOH/g. The glass transition temperature of the polyester was −68° C. This polyester polyol comprises malonate moieties, calculated as —CO—CH$_2$—CO— with a molar mass of 70.05 g/mol, in a mass fraction of 34.0%.

Example 2: Polyurethane Dispersion with Malonate Functionality 150 g of the polyester polyol from Example 1a were mixed with 42 g of Ymer® N120 and heated to 60° C. Then, 57 g TMXDI, and 24 g of IPDI were added to this mixture and the temperature was kept below 65° C. for one hour. 30 g of dipropyleneglycol-dimethylether were then added. The temperature of the reaction mixture was further increased to 80° C. and maintained until a mass fraction of isocyanate groups in the reaction mixture of 5.5% was reached. In a second vessel, 300 g of deionised water and 34.1 g of diethanolamine were heated to 30° C. and the urethane prepolymer was added while stirring at 200 min$^{-1}$. A polyurethane dispersion was obtained which was cooled down to room temperature (23° C.). The resin dispersion had a mass fraction of solids of 48.8%, a dynamic viscosity of 1540 mPa·s and an average particle size of 164 nm with a dispersity of 0.31. In theory the resin had a specific amount of substance of CH-acidic hydrogen atoms of 3.115 mol/kg, based on the mass of solids ("equivalent weight of acidic hydrogen" of 321 g/mol).

Example 3: Polyurethane Dispersion with Malonate Functionality 76 g of the polyester polyol from Example 1b were mixed with 42 g of Ymer® N120 and heated to 60° C. Then, 57 g of TMXDI and 24 g of IPDI were added to this mixture and the temperature was kept below 65° C. for one hour. The temperature was then further increased to 135° C. and maintained until a urethane prepolymer with a mass fraction of isocyanate groups in the reaction mixture of 7.4% was obtained. In a second vessel, 200 g of deionised water and 33.2 g of diethanolamine were heated to 70° C. and the urethane prepolymer was added while stirring at 200 min$^{-1}$. Temperature was kept below 85° C., and a mixture of 0.75 g of 2-methylpentane-1,5-diamine and 20 g of deionised water were added. The polyurethane dispersion obtained was cooled down to room temperature (23° C.). The resin dispersion had a mass fraction of solids of 38.4%, a dynamic viscosity of 4445 mPa·s and an average particle size of 71 nm with a dispersity of 0.17. In theory, the resin had a specific amount of substance of CH-acidic hydrogen atoms of 3.33 mol/kg, based on the mass of solids (corresponding to an "equivalent weight of acidic hydrogen" of 300 g/mol).

Example 4: Polyurethane Dispersion with Malonate and Acryloyl Functionality

A mixture of 1500 g of Ymer® N120, 3388 g of the malonate polyester polyol of Example 1a, 935 g of PETIA, 1760 g of EO-TMPTA, 1.8 g of DBTL, and 7 g of hydroquinone monomethylether was heated to 60° C. while purging with air. Over the course of two hours, 1293 g of IPDI were added, and the temperature was maintained at 70° C. until a mass fraction of isocyanate groups in the reaction mixture of 0.5% was reached. 468 g of methoxypropanol were then added, and the temperature was maintained until no more isocyanate could be determined. This prepolymer was dispersed in 8400 g of deionised water at a temperature of 50° C. Viscosity was adjusted by addition of further deionised water, and the resin was cooled down to room temperature (23° C.). The resin dispersion obtained had a mass fraction of solids of 50.2%, a dynamic viscosity of 2445 mPa·s and an average particle size of 64 nm with a dispersity of 0.06.

Example 5: Polyurethane Dispersion with Malonate and Acryloyl Functionality

A mixture of 1450 g of Ymer® N120, 2050 g of the malonate polyester polyol of Example 1b, 1100 g of PC-diol, 2244 g of DPHA, 1.8 g of DBTL, and 7 g of hydroquinone monomethylether was heated to 60° C. while purging with air. Over the course of two hours, 1293 g of IPDI were added and the temperature was maintained at 70° C. until a mass fraction of isocyanate groups in the reaction mixture of 0.5% was reached. 906 g of dipropyleneglycol diethylether and 533 g of methoxypropanol were added, and the temperature was maintained until no more isocyanate could be determined. This prepolymer was dispersed in 6700 g of deionised water at a temperature of 50° C. Viscosity was adjusted by adding further deionised water and the resin dispersion was cooled down to room temperature (23° C.). The resin dispersion had a mass fraction of solids of 41.2%, a dynamic viscosity of 2590 mPa·s and an average particle size of 130 nm with a dispersity of 0.13.

Example 6: Polyurethane Dispersion with Malonate and Acryloyl Functionality

A mixture of 1500 g of Ymer® N120, 2050 g of the malonate polyester polyol of Example 1b, 1050 g of PC-diol, 935 g of PETIA, 1420 g of di-TMPA4, 1.8 g of DBTL, and 7 g of hydroquinone monomethylether was heated to 60° C. while purging with air. Over the course of two hours, 1293 g of IPDI were added, and the temperature was maintained at 70° C. until a mass fraction of isocyanate groups in the reaction mixture of 0.5% was reached. 435 g of methoxypropanol were added, and the temperature was maintained until no more isocyanate could be determined. This prepolymer was dispersed in 7800 g of deionised water at a temperature of 50° C. Viscosity was adjusted by addition of further deionised water, and the resulting resin dispersion was cooled down to room temperature (23° C.). The final resin had a mass fraction of solids of 51.0%, a dynamic viscosity of 2180 mPa·s, and an average particle size of 93 nm with a dispersity of 0.14.

Example 7: Polyurethane Dispersion with Malonate and Acryloyl Functionality

A mixture of 1245 g of Ymer® N120, 3388 g of the malonate polyester polyol of Example 1a, 255 g of PC-diol, 935 g of PETIA, 1760 g of EO-TMPTA, 1.8 g of DBTL, and 7 g of hydroquinone monomethylether was heated to 60° C. while purging with air. Over the course of two hours, 1293 g of IPDI were added, and the temperature was maintained at 70° C. until a mass fraction of isocyanate groups in the reaction mixture of 0.5% was reached. 468 g of methoxypropanol were added, and the temperature was maintained until no more isocyanate could be determined. This prepolymer was dispersed in 8400 g of deionised water at a temperature of 50° C. Viscosity was adjusted by addition of further deionised water, and the resin dispersion was cooled down to room temperature (23° C.). The resin dispersion had a mass fraction of solids of 49.9%, a dynamic viscosity of 1699 mPa·s, and an average particle size of 84 nm with a dispersity of 0.11.

Example 8: Polyurethane Dispersion with Malonate and Acryloyl Functionality

A mixture of 1500 g of Ymer® N120, 2050 g of the malonate polyester polyol of Example 1b, 1050 g of PC-diol, 935 g of PETIA, 1371 g of EBECRYL® 1290 (hexa-functional urethane acrylate, Allnex Belgium S.A./N.V.), 1.8 g of DBTL, and 7 g of hydroquinone monomethylether was heated to 60° C. while purging with air. Over the course of two hours, 1293 g of IPDI were added, and the temperature was maintained at 70° C. until a mass fraction of isocyanate groups in the reaction mixture of 0.5% was reached. 435 g of methoxypropanol were added, and the temperature was maintained until no more isocyanate could be determined. This prepolymer was dispersed in 7800 g of deionised water at a temperature of 50° C. Viscosity was adjusted by addition of further deionised water, and the resin dispersion was cooled down to room temperature (23° C.). The resin dispersion obtained had a mass fraction of solids of 47.6%, a dynamic viscosity of 1040 mPa·s, and an average particle size of 80 nm with a dispersity of 0.11.

Example 9: Polyurethane Dispersion with Malonate and Acryloyl Functionality

A mixture of 1245 g of Ymer® N120, 3388 g of the malonate polyester polyol of Example 1a, 255 g of PC-diol, 935 g of PETIA, 977 g of EO-TMPTA, 1.8 g of DBTL, and 7 g of hydroquinone monomethylether was heated to 60° C. while purging with air. Over the course of two hours, 1293 g of IPDI were added, and the temperature was maintained at 70° C. until a mass fraction of isocyanate groups in the reaction mixture of 0.5% was reached. 468 g of methoxypropanol were added and temperature maintained until no more isocyanate could be determined. Then, this prepolymer was dispersed in 6200 g of deionised water at a temperature of 50° C. Viscosity was adjusted with further deionised water and the resin was cooled down to room temperature (25° C.). The resin thus obtained had a mass fraction of solids of 45.7%, a dynamic viscosity of 1280 mPa·s, and an average particle size of 82 nm with a dispersity of 0.10.

Example 10: Polyurethane Dispersion with Malonate and Acryloyl Functionality 1245 g of Ymer® N120, 3388 g of the malonate polyester polyol of Example 1a, 255 g of PC-diol, 467.5 g of PETIA, 408 g of di-TMPA3, 500 g of EOPO-PEA4, 595 g of di-TMPA4, 1.8 g of DBTL, and 8.1 g of butylhydroxytoluene were heated to 60° C. while purging with air. Over the course of two hours, 1293 g of IPDI were added and the temperature was maintained at 70° C. until a mass fraction of isocyanate groups in the reaction mixture of 0.7% was reached. 430 g of methoxypropanol were then added, and the temperature was maintained for one further hour. Then, this prepolymer was dispersed in a mixture of 6300 g of deionised water and 95 g of diethanolamine at a temperature of 30° C. Viscosity was adjusted by addition of further deionised water and the resin was cooled down to room temperature (25° C.). The resin obtained had a mass fraction of solids of 44.7%, a dynamic viscosity of 1980 mPa·s, and an average particle size of 92 nm with a dispersity of 0.15.

Example 11: Blend of Polyurethane Dispersion with Malonate Functionality and Acryloyl-Functional Polyurethane Dispersion 781 g of the resin dispersion of example 3 were blended at 25° C. with 626 g of UCECOAT® 7655 (a waterbased urethane acrylate with a mass fraction of solids of 35%, and an acid value of 10 mg/g, based on the mass of the resin dispersion) and a specific amount of substance of carbon-carbon double bonds in the dispersion of 1.597 mol/kg ("double bond equivalent weight" of 626 g/mol, based on mass of the resin dispersion). The blending ratio was chosen such that a theoretic ratio $n_{>C=C<}/n_{HA}$ of the amount of substance $n_{>C=C<}$ of carbon-carbon double bonds to the amount of substance $n_{HA}$ of acidic C—H-groups of 1 mol:1 mol was achieved. The mixture was stirred for two hours and was used for formulation after one week of storage at room temperature (23° C.).

Example 12: Formulation of Clearcoats

The components as listed in table 1 were mixed in the given sequence on a laboratory blender. If necessary the viscosity of the clearcoat was further reduced by the addition of deionised water. One hour after mixing all components the clearcoat was applied onto substrates (glass plates for pendulum hardness determination or steel panels with cured waterbased 2-pack epoxy primer for solvent resistance testing) with a lab applicator in a wet film thickness of 200 μm. After 30 min of flash-off the clearcoats were either cured at 23° C./50% relative humidity only (RT) or forced cured for 30 min at 80° C. or for 15 hours at 70° C. The coated panels were stored at 23° C./50% relative humidity before further testing.

TABLE 1

Composition of the Formulations

| | Form1 | Form2 | Form3 | Form4 |
|---|---|---|---|---|
| Resin of Example 2 | 109.5 g | | | |
| Resin of Example 3 | | 130.2 g | | |
| Resin of Example 11 | | | 100 g | 100 g |
| UCECOAT ® 7655 [1] | 104.3 g | 104.3 g | | |
| NaOH, 10% [2] | 7.43 g | 7.43 g | 3.21 g | 3.21 g |
| ADDITOL ® VXW 6503N [3] | 1.67 g | 1.67 g | | |
| ADDITOL ® VXW 6211 [4] | 0.5 g | 0.5 g | | |
| TBAH, 10% [5] | 13.32 g | 13.32 g | 4.83 g | |
| TBA-Bicarbonate, 50% [6] | 1.13 g | | | |

[1] waterbased urethane acrylate with a mass fraction of solids of 35%, an acid value of 10 mg/g (based on the mass of the resin dispersion) and a specific amount of substance of >C=C< double bonds of 1.60 mol/kg (double bond equivalent weight of 626 g/mol, based on the mass of the resin dispersion), Allnex Belgium SA/NV
[2] sodium hydroxide solution in deionised water, mass fraction $w_{NaOH}$ of dissolved NaOH in the solution is $m_{NaOH}/m_{Sol} = 10\%$
[3] Silicone based substrate wetting additive, Allnex Austria GmbH
[4] physiologically safe defoamer, Allnex Austria GmbH
[5] tetrabutylammonium hydroxide solution in deionised water, mass fraction $w_{Bu4NOH}$ of dissolved $Bu_4N^+$ $OH^-$ in the solution is $m_{Bu4NOH}/m_{Sol} = 10\%$
[6] tetrabutylammonium bicarbonate solution in deionised water, mass fraction $w_{Bu4N\,HCO3}$ of dissolved $Bu_4N^+$ $HCO_3^-$ in the solution is $m_{Bu4N\,HCO3}/m_{Sol} = 50\%$

Example 13: Application Test—Polyurethane Dispersion with Malonate Functionality and Acryloyl-Functional Polyurethane Dispersion Mechanical tests (pendulum hardness H according to the König method, stated as measured value in seconds, tested 24 hours after exposure to curing conditions as mentioned) and chemical resistance tests were made using the clear coating compositions of example 12. The results are listed in table 2.

TABLE 2

Mechanical Test and Chemical Resistance Test for the Formulations

|  | Form1 | Form2 | Form3 | Form4 |
|---|---|---|---|---|
| König Hardness | | | | |
| curing for 1 d at 25° C. | 27 s | 20 s | 15 s | 16 s |
| curing for 30 min at 80° C. | 47 s | 51 s | 34 s | 36 s |
| curing for 15 h at 70° C. | 155 s | 118 s | 129 s | 141 s |
| Solvent spot test for different curing conditions | | | | |
| curing for 1 d at 25° C. | | | | |
| Ethanol | 1.5 min | 2 min | 1 min | 1 min |
| Acetone | 1.5 min | 2 min | 1 min | 1 min |
| Xylene | 11 min | >15 min | >15 min | >15 min |
| curing for 30 min at 80° C. | | | | |
| Ethanol | 3.5 min | 2 min | 1 min | 1 min |
| Acetone | 2.5 min | 2 min | 1 min | 1 min |
| Xylene | >15 min | >15 min | >15 min | >15 min |
| curing for 15 h at 70° C. | | | | |
| Ethanol | 11 min | 8 min | 6 min | 7 min |
| Acetone | 7.5 min | 8 min | 9.5 min | 12 min |
| Xylene | >15 min | >15 min | >15 min | >15 min |

Example 14: Application Test—Polyurethane Dispersion with Malonate and Acryloyl Functionality and Different Michael Addition Catalysts Clear coat coating compositions of the formulations Form5 to Form9 were made according to table 3 using the resin of Example 8.

TABLE 3

Constituents of formulations Form 5 to Form 9 and Results of Mechanical and Chemical Resistance Tests

|  | Form5 | Form6 | Form7 | Form8 | Form9 |
|---|---|---|---|---|---|
| Composition of the Formulations | | | | | |
| Resin of Example 8 | 50 g | 50 g | 50 g | 50 g | 50 g |
| NaOH, 10% [1] | | 0.25 g | 0.25 g | 0.25 g | 0.25 g |
| TBAH, 10% [2] | 6.18 g | | | | |
| DBU, 10% [3] | | | 3.62 g | | |
| DABCO, 10% [4] | | | | 2.67 g | |
| TBA-Bicarbonate 50% [5] | | | | | 1.44 g |
| König Hardness after 24 h | | | | | |
| curing for 1 d at 25° C. | sticky | 12 s | sticky | sticky | 48 s |
| curing for 30 min at 80° C. | 25 s | 8 s | sticky | 70 s | |
| curing for 15 h at 70° C. | 40 s | 13 s | 14 s | 74 s | |
| König Hardness after 4 d | | | | | |
| curing for 1 d at 25° C. | sticky | 15 s | sticky | sticky | 66 s |
| curing for 30 min at 80° C. | 27 s | 9 s | sticky | 76 s | |
| curing for 15 h at 70° C. | 41 s | | 13 s | 72 s | |

[1] sodium hydroxide solution in deionised water, mass fraction $w_{NaOH}$ of dissolved NaOH in the solution is $m_{NaOH}/m_{Sol} = 10\%$
[2] tetrabutylammonium hydroxide solution in deionised water, mass fraction $w_{Bu4NOH}$ of dissolved $Bu_4N^+$ $OH^-$ in the solution is $m_{Bu4NOH}/m_{Sol} = 10\%$
[3] 1,8-diazabicyclo[5.4.0]undec-7-ene (DABU) solution in deionised water, mass fraction $w_{DABU}$ of dissolved DABU in the solution is $m_{DABU}/m_{Sol} = 10\%$
[4] diazabicyclo[2.2.2]octane (DABCO) solution in deionised water, mass fraction $w_{DABCO}$ of dissolved DABCO in the solution is $m_{DABCO}/m_{Sol} = 10\%$
[5] tetrabutylammonium bicarbonate solution in deionised water, mass fraction $w_{Bu4N\ HCO3}$ of dissolved $Bu_4N^+$ $HCO_3^-$ in the solution is $m_{Bu4N\ HCO3}/m_{Sol} = 50\%$

Example 15: Blocked Michael Addition Catalyst 94.21 g of diethylcarbonate were stirred in a glass flask at 23° C. while introducing 372.4 g of an aqueous tetrabutyl ammonium hydroxide solution with a mass fraction of 55% in the solution, in a way that a reaction temperature of 30° C. was not exceeded. After that, further 533 g of deionised water were added. The final product had an amine value of 44 mg/g, based on the mass of the solution.

Example 16: Application Test—Polyurethane Dispersion with Malonate and Acryloyl Functionality and Different Michael Addition Catalysts Clear coat coating compositions have been made using resins of examples 4 to 7 according to the recipes of table 4, and the test results for these are also collected in table 4.

TABLE 4

Composition and Test Results for Formulations Form10 to Form18

|  | Form10 | Form11 | Form12 | Form13 | Form14 | Form15 | Form16 | Form17 | Form18 |
|---|---|---|---|---|---|---|---|---|---|
| Composition of the Formulations | | | | | | | | | |
| Resin of Ex. 4 | 50 g | | | | 50 g | | | | |
| Resin of Ex. 5 | | 50 g | | | | 50 g | | | |
| Resin of Ex. 6 | | | 50 g | | | | 50 g | | |
| Resin of Ex. 7 | | | | 50 g | | | | 50 g | 50 g |
| NaOH [1] | | | | | 0.25 g | 0.18 g | 0.25 g | 0.11 g | |
| TBAHCO3 [2] | | | | | 1.42 g | 1.73 g | 1.4 g | 1.51 g | |
| Catalyst [3] | | | | | | | | | 3.15 g |
| König Hardness after 24 h, for curing conditions as specified | | | | | | | | | |
| 1 d at 25 C. | sticky | sticky | sticky | sticky | 66 s | 54 s | 61 s | 63 s | 65 s |
| 30 min at 80° C. | | | | | 93 s | 73 s | 75 s | 91 s | 94 s |
| 15 h at 70 C. | | | | | 101 s | 86 s | 87 s | 103 s | 105 s |

TABLE 4-continued

Composition and Test Results for Formulations Form10 to Form18

| | Form10 | Form11 | Form12 | Form13 | Form14 | Form15 | Form16 | Form17 | Form18 |
|---|---|---|---|---|---|---|---|---|---|
| Solvent resistance after 30 min at 80° C. forced cure | | | | | | | | | |
| Ethanol | | | | | 11 min | 4.5 min | 4 min | 28 min | 30 min |
| Acetone | | | | | 3 min | 1 min | 1 min | 4 min | 4 min |
| Xylene | | | | | 19 min | 14 min | 6.5 min | 30 min | 30 min |

[1] sodium hydroxide solution in deionised water, mass fraction $w_{NaOH}$ of dissolved NaOH in the solution is $m_{NaOH}/m_{Sol}$ = 10%
[2] tetrabutylammonium bicarbonate solution in deionised water, mass fraction $w_{Bu4N\ HCO3}$ of dissolved $Bu_4N^+$ $HCO_3^-$ in the solution is $m_{Bu4N\ HCO3}/m_{Sol}$ = 50%
[3] blocked catalyst of Example 15, the mass 3.15 g of blocked catalyst solution in Form18 contains the same amount of substance of $Bu_4N^+$ as 1.51 g of TBAHCO3 solution of Form17

Example 17: White Topcoat Based on Polyurethane Dispersion with Malonate and Acryloyl Functionality A grinding formulation was mixed according to the following recipe of table 5, and ground in a bead mill:

TABLE 5

| Composition of Grinding Resin | |
|---|---|
| Resin of Example 9 | 52.58 g |
| ADDITOL ® VXW 6208 [1] | 3.78 g |
| KRONOS ® 2310 [2] | 72.5 g |
| ADDITOL ® VXW 6211 [3] | 0.15 g |
| Sum | 129.01 g |

[1] aqueous dispersing additive, non-ionically modified acrylic polymer, Allnex Austria GmbH
[2] white pigment based on $TiO_2$ (rutile), Kronos International
[3] physiologically safe defoamer, Allnex Austria GmbH This grinding formulation was let down with further 149 g of the resin from Example 9. To this lacquer the catalyst package (0.32 g of an aqueous sodium hydroxide solution having a mass fraction of dissolved NaOH of 10%, 5.5 g of an aqueous solution of tetrabutylammonium bicarbonate solution having a mass fraction of dissolved salt of 50%) was added. This coating was applied onto glass plates and steel panels coated with a cured water-based 2-pack epoxy primer in a wet film thickness of 200 μm, the first set a samples one hour after mixing in the catalyst, and the second set of samples seventy-two hours after mixing in the catalyst. After thirty minutes of flash-off, the clearcoats were either cured at room temperature (23° C.) and 50% of relative humidity ("RT cure"), or forced cured for 30 min at 80° C. ("forced cure"). The coated panels were stored after curing as indicated in the table, at 23° C. and 50% of relative humidity before further testing. The test results are collected in the following table 6.

TABLE 6

| Test Data | | |
|---|---|---|
| Application after: | 1 h potlife | 72 h potlife |
| König Hardness after 24 h | | |
| RT cure | 65 s | 62 s |
| forced cure | 89 s | 77 s |
| Hardness after 4 d | | |
| RT cure | 80 s | 72 s |
| forced cure | 90 s | 83 s |
| Cross cut after 4 days (Topcoat on EP primer) | | |
| RT cure | 0 | 0 |
| forced cure | 0 | 0 |
| Colour and gloss values | | |
| L | 96.78 | 96.83 |
| a | −0.63 | −0.71 |
| b | 0.99 | 1.04 |
| 20° | 91.2 | 93.1 |
| 60° | 93.9 | 90.8 |

Example 18: Hydrophilic Modification of the Polyurethane 18.1: 150 g (143 mmol) of the polyester polyol from Example 1a were mixed with 42 g (42 mmol) of Ymer® N120 and heated to 60° C. Then, 57 g (233 mmol) of TMXDI, and 24 g (108 mmol) of IPDI were added to this mixture and the temperature was kept below 65° C. for one hour. 30 g of dipropyleneglycol-dimethylether were then added. The temperature of the reaction mixture was further increased to 80° C. and maintained until a mass fraction of isocyanate groups of 5.5% was reached in the prepolymer so obtained. In a second vessel, 300 g of deionised water and 34.1 g of diethanolamine were heated to 30° C. and the urethane prepolymer was added while stirring at 200 min$^{-1}$. A polyurethane dispersion was obtained which was cooled down to room temperature (23° C.). The resin dispersion had a mass fraction of solids of 48.8%, a dynamic viscosity of 1540 mPa·s and an average particle size of 164 nm with a dispersity of 0.31. In theory the resin had a specific amount of substance of CH-acidic hydrogen atoms of 3.115 mol/kg, based on the mass of solids ("equivalent weight of acidic hydrogen" of 321 g/mol).

18.2: In a second run, 42 g of Ymer® N120 were replaced by 5.6 g of dimethylolpropionic acid. It was found that the dimethylolpropionic acid did not dissolve completely in the reaction mixture. The resulting dispersion was neutralised by addition of aqueous sodium hydroxide solution in an amount to neutralise 50% of the acid groups introduced by dimethylolpropionic acid. Addition of N-methylpyrrolidone or N-ethylpyrrolidone helped to dissolve the acid in the first steps of the reaction, but the presence of these solvents was not desired.

18.3: In a third run, the mass of Ymer® N120 was reduced from 42 g to 28 g, and 1.9 g of dimethylolpropionic acid were dispersed under gentle heating in the Ymer® N120. The mixture was added to the polyester polyol, and both were heated to 60° C. under stirring. No undissolved dimethylolpropionic acid was found after thirty minutes. The reaction was then continued by addition of the isocyanates as described in 17.1. The resulting dispersion was neutralised by addition of aqueous sodium hydroxide solution in an amount to neutralise 50% of the acid groups introduced by dimethylolpropionic acid. The polyurethane dispersion obtained was cooled down to room temperature (23° C.), and showed no lack of stability.

Example 19 Chain-Extended Polyurethane Dispersion with Malonate Functionality In a variant of Example 2, diethanolamine was replaced by 2-methyl-1,5-pentanediamine. A chain-extended polyurethane dispersion was obtained.

Example 20 Synthesis of a Malonate Polyester with Co-Emulsified Michael Acceptor 800.9 g of diethylmalonate, 960.4 g of TCD-alcohol, 555.6 g of Ymer N120 and 0.35 g of MBTO were mixed and heated to 175° C. during the course of two hours while ethanol was distilled off entirely. The reaction mixture was maintained at that temperature until a resin was obtained with a mass fraction of solids of 99.0% and a mass average molar mass $M_m$ of 3924 g/mol, as determined by GPC. 186 g of this polyester were mixed with 87.75 g of di-TMPA3 at 70° C. This mixture was dispersed into 224 g of water. Viscosity was adjusted by addition of further 16.5 g of water to a dynamic viscosity of 1870 mPa·s, the mass fraction of solids was then 52.7%.

Example 21 Synthesis of a Malonate Polyester with Co-Emulsified Michael Acceptor 800.9 g of diethylmalonate, 980 g of TCD-alcohol, 926 g of Ymer® N120, and 0.35 g of MBTO were mixed and heated to 175° C. during the course of two hours while ethanol was distilled off entirely. The reaction mixture was maintained at that temperature until a resin was obtained having a mass fraction of solids of 98.0%, and a mass average molar mass $M_m$ of 3378 g/mol. 225 g of this polyester were mixed with 87.75 g of di-TMPA3 at 70° C. This mixture was dispersed into 255 g of deionised water; viscosity was adjusted by addition of further 28 g of deionised water to obtain a dynamic viscosity of 2167 mPa·s and a mass fraction of solids of 52.1%.

Example 22 Nonionic/anionic Polyurethane Dispersion with Malonate and Acryloyl Functionality 3388 g of the malonate polyester polyol of Example 1a, 200 g of dimethylolpropionic acid and 430 g of dipropyleneglycol dimethylether were heated to 60° C. 1487 g of IPDI were added and the temperature was further increased to 100° C. to achieve a mass fraction of isocyanate groups in the reaction mixture of 3.5%. Then, 8.1 g of butylhydroxytoluene, 900 g of Ymer® N120, 467.5 g of PETIA, 408 g of di-TMPA3, 500 g of EOPO-PEA4, and 595 g di-TMPA4 were added while reducing the temperature to 70° C. until a mass fraction of isocyanate groups in the reaction mixture of 0.8% was reached. 430 g of methoxypropanol were then added, and the temperature was maintained for one further hour. Then, this prepolymer was dispersed in a mixture of 6300 g of deionised water, 81 g of diethanolamine, and 120 g of an aqueous sodium hydroxide solution with a mass fraction of solids of 50%, at a temperature of 30° C. Viscosity was adjusted by addition of further deionised water and the resin cooled down to room temperature. The final resin had a mass fraction of solids of 34.8%, a dynamic viscosity of 700 mPa·s, and an average particle size of 60 $n_m$ with a dispersity of 0.37.

Example 23 Hardness Development and Solvent Resistance

Clear coat coating compositions have been made using the binder resins of examples 20 and 21, according to the recipes in table 7a. The test results are collected in the same table.

TABLE 7a

Composition of Clearcoat Coating Mixtures (Mass of Ingredients in g) and Test Results for Hardness Development and Solvent Resistance

| Ingredients | Form19 | Form20 |
|---|---|---|
| Resin of Example 20 |  | 50 g |
| Resin of Example 21 | 50 g |  |
| Catalyst from Example 15 | 3.28 g | 3.32 g |
| 1 day at 25° C. | 26 s | 75 s |
| 30 min at 60° C. | 30 s | 76 s |
| 30 min at 80° C. | 34 s | 108 s |
| 1 day at 25° C. | 29 s | 116 s |
| 30 min at 60° C. | 30 s | 120 s |
| 30 min at 80° C. | 34 s | 130 s |
| Ethanol | 2 min | 5 min |
| Acetone | 1 min | 2 min |

*Not determined

Hardness development and solvent resistance show that a lower amount of the non-ionic hydrophilic modifier Ymer® N 120 (Form20; binder resin for Example 20) leads to better hardness and better solvent resistance than a higher amount of that modifier (Form19, binder resin of Example 21).

Clear coat coating compositions have been made using the binder resins of example 22, according to the recipes in table 7b. The test results are collected in the same table.

TABLE 7b

Composition (in g) and Test Results

| Ingredients | Form21 | Form22 |
|---|---|---|
| Resin of Example 22 | 50 g | 50 g |
| Catalyst from Example 15 | 2.19 g | 4.38 g |
| 1 day at 25° C. | tacky | 22 s |
| 30 min at 60° C. | tacky | 66 s |
| 30 min at 80° C. | 82 s | 98 s |
| 1 day at 25° C. | 47 s | 73 s |
| 30 min at 60° C. | 65 s | 101 s |
| 30 min at 80° C. | 84 s | 100 s |
| Ethanol | n.d.* | n.d. |
| Acetone | n.d. | n.d. |

*Not determined

Comparison of formulations Form21 and Form22 shows that the binder resin of Example 22 requires a higher amount of catalyst in order to achieve good hardness development, particularly at ambient temperature. This is most probably due to the fact that the acid functionality of this binder resin interferes with basic catalysis of the Michael addition cross-linking.

Example 24 Formulation of Clearcoat Coating Compositions for Combined Radiation and Thermal Curing The components listed in table 8 were mixed in the given sequence in a lab blender. If necessary the viscosity of the coating composition was further reduced by the addition of deionised water. One hour after mixing, the clearcoat coating compositions were applied onto substrates (glass plates for pendulum hardness determination) with a lab applicator in a wet film thickness of 200 μm. After 30 min of flash-off at room temperature (23° C.) and 15 minutes storing at 60° C., the coating compositions were either cured by UV radiation (800 mJ/cm², Hg lamp) and/or thermally at 23° C. and 50% relative humidity only, or forced cured for thirty minutes at 80° C., or for fifteen hours at 70° C. The sample that was thermally cured for thirty minutes at 80° C. was as well UV cured after thermal crosslinking, to investigate the feasibility of this process. The coated panels were stored at 23° C. and 50% relative humidity for 24 h before further testing.

followed by UV cure" or "UV cure followed by thermal cure". This makes this binder system particularly interesting for dual-cure applications.

Example 25 Formulation of Yellow Topcoat Compositions for Combined Radiation and Thermal Curing The components listed in the table 9 were mixed in the given sequence in a lab blender. The pigmented coating compositions were applied with a lab applicator onto the substrates (glass plates for Persoz hardness and sanded kitchen board for scratch and acetone resistance) as a wet film thickness of 120 μm followed by 30 min drying at room temperature (23° C.) and 15 minutes flash-off at 60° C. only when indicated). The coatings were cured by UV radiation (5 m/min @ 80 W/cm, Ga+Hg lamp). The coated panels were stored at 23° C. and 50% relative humidity for 24 h before further testing of hardness, mar and chemical resistance.

TABLE 8

Composition and Test Results of Formulations

| Ingredients | Form23 | | Form24 | |
|---|---|---|---|---|
| Resin of Example 10 | 100 g | | 50 g | |
| UCECOAT ® 7738 [1] | 50 g | | | |
| ADDITOL ® VXW 6503 N [2] | 0.3 g | | 0.3 g | |
| ONMIRAD ® 1173 [3] | 1.5 g | | 1.5 g | |
| Catalyst of Example 15 | 5.4 g | | 5.4 g | |
| Molar ratio double bonds/active —C—H | 75% | | 153% | |
| Curing | UV (+thermal) | Thermal (+UV) | UV (+thermal) | Thermal (+UV) |
| | 30 min RT + 15 min 60° C. tack free | 30 min RT + 15 min 60° C. tack free | 30 min RT + 15 min 60° C. slightly tacky | 30 min RT + 15 min 60° C. slightly tacky |
| König hardness | 25 s after UV | 24 s | 16 s after UV | 14 s |
| König hardness | 55 s After further 7 days at RT 66 s | After further 7 days at RT 61 s | 86 s After further 7 days at RT 95 s | After further 7 days at RT 36 s |
| Curing | (30 min RT + 15 min 60° C. + UV) + 30 min 80° C. | (30 min RT + 15 min 60° C.) + 30 min 80° C. | (30 min RT + 15 min 60° C. + UV) + 30 min 80° C. | (30 min RT + 15 min 60° C.) + 30 min 80° C. |
| König hardness | 66 s | 60 s + UV | 84 s | 47 s + UV |
| König hardness | | 68 s | | 86 s |
| Curing | (30 min RT + 15 min 60° C. + UV) + 15 h 70° C. | (30 min RT + 15 min 60° C.) + 15 h 70° C. | (30 min RT + 15 min 60° C. + UV) + 15 h 70° C. | (30 min RT + 15 min 60° C.) + 15 h 70° C. |
| König hardness | 80 s | 77 s | 90 s | 82 s |

[1] UCECOAT 7738 is a mixed anionically and nonionically stabilized waterbased urethane acrylate with a mass fraction of solids of 38%, an acid value of 0.9 mg/g (based on the mass of the resin dispersion) and a specific amount of substance of >C=C< double bonds of 2.4 mol/kg (based on the mass of the resin), Allnex Belgium SA/NV
[2] see table 1
[3] OMNIRAD 1173 is a photoinitiator made from 2-hydroxy-2-methyl-1-phenylpropanone (IGM Resins B.V., Waalwijk)

These experiments show that the binder system can be cured thermally as well as also by radiation with UV light if a photoinitiator is added to the formulation. The efficiency of photo induced cure can be enhanced when the total amount of reactive double bonds based on binder solids is increased (e.g. by adding a resin with a high specific amount of substance of >C=C< double bonds to the formulation). There is no significant difference between the final curing result regardless if the sequence of cure is "thermal cure The hardness was measured using Persoz pendulum equipment according to standard ASTM D4366-16, test method B.

The mar resistance is a mechanical resistance test for coatings whose surface deformation is assessed by finger nail friction. It is being evaluated with a 1-5 scale, 5=No visible mark, 4=Very light mark, 3=Light mark, 2=Clear mark, 1=Strong mark.

The chemical resistance is assessed by spreading an acetone droplet (~3 cm diameter) on the coating surface for 5 minutes. It is being evaluated with a 1-5 scale, 5=Full solvent resistance with no change after dry wipe, 4=Slight dull surface stain after dry wipe, 3=Swelling coating starts to release form carrier, 2=Strong swelling coating releases from carrier, 1=Soluble and removed after dry wipe.

TABLE 9

|  | Form 25 | Form 26 |
|---|---|---|
| UCECOARD7738 | 80.0 | 40.0 |
| AMP 95 (1:1 water) | 0.4 | 0.2 |
| LUCONYUD NG Yellow 1995 | 20 | 20 |
| Water | 6.6 | 6.6 |
| OMNIRAD ® 2010 | 2.0 | 1.0 |
| BYK ® 093 | 0.3 | 0.3 |
| BYK ® 378 | 0.5 | 0.5 |
| TEGO ® glide 432 | 0.1 | 0.1 |
| EXILVA ® F01-1 | 4.0 | 4.0 |
| Resin of example 10 | — | 40.0 |
| Catalyst of example 15 | — | 2.2 |

|  | Thermal 60° C | Thermal 60° C. + UV | Thermal 60° C. | Thermal 60° C. + UV |
|---|---|---|---|---|
| Persoz hardness (s) | 114 | 132 | 164 | 158 |
| Mar resistance (1-5) | 1 | 5 | 4 | 5 |
| Acetone resistance (1-5) | 1 | 5 | 4 | 5 |

LUCONYL ® NG Yellow 1995 is a proprietary oxide yellow pigment paste composition from BASF consisting of finely grinded pigments dispersed and stabilized in water at a solid content of 60%.
AMP-95 is a neutralizer from Angus Chemicals containing 2-amino-2-methyl-1-propanol with 5% added water.
OMNIRAD ® 2010 is a photoinitiator from IGM Resins made from 2-hydroxy-2-methyl-1-phenyl-propan-1-one and phenylbis(2,4,6-trimethylbenzoyl)phosphine oxide.
BYK ® 093 is a proprietary silicone-containing defoamer from Byk.
BYK ® 378 is a proprietary wetting agent from Byk containing a polyether-modified dimethylpolysiloxane.
TEGO ® Glide 432 is a proprietary flow additive and wetting agent from Evonik made from a polyether siloxane copolymer.
EXILVA ® F01-L is a proprietary rheology modifier from Borregaard made from multifunctional micro-fibrillated cellulose.

These experiments show that the reference pigmented formulation (Form 25) from UCECOAT®7738 can be crosslinked under UV light with a medium-high hardness and good mar and solvent resistance—but has no capability to be crosslinked thermally (bad mar and solvent resistance). At the contrary, the pigmented formulation (Form 26) from the blend between UCECOAT®7738 and the resin of example 10, in the presence of the catalyst of example 15, can be crosslinked thermally as well as by radiation with UV light to deliver (under these two conditions) a higher hardness with improved mar and solvent resistance. It makes this binder composition particularly interesting for dual-cure applications where it brings a strong performance and robustness in the presence of high-opacity pigments (other than white) preventing an easy UV light penetration and a deep cure of the coating. It is also particularly valuable for the efficient curing of poorly exposed areas of a complex tridimensional object (shadow curing) or in the case of low energy UV-light (LED lamp, excimer lamp).

Example 26: Polyurethane Dispersion with Malonate and Acryloyl Functionality 1204 g Ymer N120, 2050 g of Malonate Polyester Polyol (Example 1b), 1346 g Polycarbonatediol, 467.5 g PETIA, 408 g di-TMPA3, 500 g EOPO-PEA4, 595 g di-TMPA4, 1.8 g DBTL and 8.1 g butylhydroxytoluene were heated to 60° C. while purging with air. Over the course of two hours 1293 g IPDI was added and the temperature maintained at 70° C. until an NCO value of 0.7% was reached. 430 g methoxypropanol were added and temperature maintained for further one hour. Then this prepolymer was dispersed in a mixture of 6300 g deionized water and 90 g diethanolamine at a temperature of 30° C. Viscosity was adjusted with further deionized water and the resin cooled down to room temperature. The final resin had a non volatile content of 48.4%, a dynamic viscosity of 2700 mPas and a particle size distribution of 57 nm (0.10 PDI).

Example 27: Polyurethane Dispersion with Malonate and Acryloyl Functionality 1150 g Ymer N120, 2867 g of Malonate Polyester Polyol of Example 1c, 350 g Polycarbonatediol, 467.5 g PETIA, 408 g di-TMPA3, 500 g EOPO-PEA4, 595 g di-TMPA4, 1.8 g DBTL and 8.1 g butylhydroxytoluene were heated to 60° C. while purging with air. Over the course of two hours 1293 g IPDI was added and the temperature maintained at 70° C. until an NCO value of 0.7% was reached. 430 g methoxypropanol were added and temperature maintained for further one hour. Then this prepolymer was dispersed in a mixture of 6300 g deionized water and 86 g diethanolamine at a temperature of 30° C. Viscosity was adjusted with further deionized water and the resin cooled down to room temperature. The final resin had a non volatile content of 46.5%, a dynamic viscosity of 2730 mPas and a particle size distribution of 60 nm (0.10 PDI).

Example 28: Polyurethane Dispersion with Malonate and Acryloyl Functionality 1189 g Ymer N120, 2611 g of Malonate Polyester Polyol of Example 1d, 766 g Polycarbonatediol, 467.5 g PETIA, 408 g di-TMPA3, 500 g EOPO-PEA4, 595 g di-TMPA4, 1.8 g DBTL and 8.1 g butylhydroxytoluene were heated to 60° C. while purging with air. Over the course of two hours 1293 g IPDI was added and the temperature maintained at 70° C. until an NCO value of 0.7% was reached. 430 g methoxypropanol were added and temperature maintained for further one hour. Then this prepolymer was dispersed in a mixture of 6300 g deionized water and 114 g diethanolamine at a temperature of 30° C. Viscosity was adjusted with further deionized water and the resin cooled down to room temperature. The final resin had a non volatile content of 43.7%, a dynamic viscosity of 2265 mPas and a particle size distribution of 112 nm (0.13 PDI).

Example 29: Polyurethane Dispersion with Malonate and Acryloyl Functionality 1210 g Ymer N120, 2223 g of Malonate Polyester Polyol of Example 1e, 1249 g Polycarbonatediol, 467.5 g PETIA, 408 g di-TMPA3, 500 g EOPO-PEA4, 595 g di-TMPA4, 1.8 g DBTL and 8.1 g butylhydroxytoluene were heated to 60° C. while purging with air. Over the course of two hours 1293 g IPDI was added and the temperature maintained at 70° C. until an NCO value of 0.7% was reached. 430 g methoxypropanol were added and temperature maintained for further one hour. Then this prepolymer was dispersed in a mixture of 6300 g deionized water and 104 g diethanolamine at a temperature of 30° C. Viscosity was adjusted with further deionized water and the resin cooled down to room temperature. The final resin had a non volatile content of 44.8%, a dynamic viscosity of 2523 mPas and a particle size distribution of 114 nm (0.10 PDI).

Example 30: Polyurethane Dispersion with Malonate and Acryloyl Functionality 1245 g Ymer N120, 1694 g of Malonate Polyester Polyol of Example 1a, 1925 g Polycarbonatediol, 467.5 g PETIA, 408 g di-TMPA3, 500 g EOPO-PEA4, 595 g di-TMPA4, 1.8 g DBTL and 8.1 g butylhydroxytoluene were heated to 60° C. while purging with air. Over the course of two hours 1293 g IPDI was added and the temperature maintained at 70° C. until an NCO value of 0.7% was reached. 430 g methoxypropanol were added and temperature maintained for further one hour. Then this prepolymer was dispersed in a mixture of 8550 g deionized water and 104 g diethanolamine at a temperature of 30° C. Viscosity was adjusted with further deionized water and the resin cooled down to room temperature. The final resin had a non-volatile content of 40.0%, a dynamic viscosity of 2567 mPas and a particle size distribution of 122 nm (0.16 PDI).

Example 31: Polyurethane Dispersion with Malonate and Acryloyl Functionality 1745 g Ymer N120, 1694 g of Malonate Polyester Polyol of Example 1a, 1425 g Polycarbonatediol, 467.5 g PETIA, 408 g di-TMPA3, 60 g EOPO-PEA4, 1.8 g DBTL and 8.1 g butylhydroxytoluene were heated to 60° C. while purging with air. Over the course of two hours 1293 g IPDI was added and the temperature maintained at 70° C. until an NCO value of 0.7% was reached. 430 g methoxypropanol were added and temperature maintained for further one hour. Then this prepolymer was dispersed in a mixture of 8550 g deionized water and 54 g diethanolamine at a temperature of 30° C. Viscosity was adjusted with further deionized water and the resin cooled down to room temperature. The final resin had a non-volatile content of 40.8%, a dynamic viscosity of 1255 mPas and a particle size distribution of 97 nm (0.28 PDI).

Example 32: Polyurethane Dispersion with Malonate and Acryloyl Functionality 1245 g Ymer N120, 3388 g of Malonate Polyester Polyol of Example 1a, 255 g Polycarbonatediol, 467.5 g PETIA, 408 g di-TMPA3, 227 g EOPO-PEA4, 181 g di-TMPA3, 1.8 g DBTL and 8.1 g butylhydroxytoluene were heated to 60° C. while purging with air. Over the course of two hours 1293 g IPDI was added and the temperature maintained at 70° C. until an NCO value of 0.7% was reached. 430 g methoxypropanol were added and temperature maintained for further one hour. Then this prepolymer was dispersed in a mixture of 6300 g deionized water and 85 g diethanolamine at a temperature of 30° C. Viscosity was adjusted with further deionized water and the resin cooled down to room temperature. The final resin had a non-volatile content of 34.8%, a dynamic viscosity of 1480 mPas and a particle size distribution of 109 nm (0.14 PDI).

Example 33: Polyurethane Dispersion with Malonate and Acryloyl Functionality 1245 g Ymer N120, 3388 g of Malonate Polyester Polyol of Example 1a, 255 g Polycarbonatediol, 467.5 g PETIA, 408 g di-TMPA3, 1020 g EOPO-PEA4, 812 g di-TMPA3, 1.8 g DBTL and 8.1 g butylhydroxytoluene were heated to 60° C. while purging with air. Over the course of two hours 1293 g IPDI was added and the temperature maintained at 70° C. until an NCO value of 0.7% was reached. 430 g methoxypropanol were added and temperature maintained for further one hour. Then this prepolymer was dispersed in a mixture of 6300 g deionized water and 115 g diethanolamine at a temperature of 30° C. Viscosity was adjusted with further deionized water and the resin cooled down to room temperature. The final resin had a non-volatile content of 47.4%, a dynamic viscosity of 2892 mPas and a particle size distribution of 95 nm (0.10 PDI).

Example 34: Hardness Development of Clearcoats

Components were mixed according to following table 10 on a lab blender and then applied to glass plates in a wet film thickness of 200 μm. After 1 day as well as after 1 week at 23° C./50% relative humidity the pendulum hardness was determined.

TABLE 10

| | | | | | |
|---|---|---|---|---|---|
| Resin of Example 10 (44.7%) | 50 | | | | |
| Resin of Example 27 (46.5%) | | 50 | | | |
| Resin of Example 26 (48.4%) | | | 50 | | |
| Resin of Example 28 (43.7%) | | | | 50 | |
| Resin of Example 29 (44.8%) | | | | | 50 |
| Catalyst of Example 15 | 2.5 | 2.6 | 2.7 | 2.4 | 2.5 |
| % Ymer, solids | 15% | 15% | 15% | 15% | 15% |
| Diol used in Polyester polyol | TCD | BEPD | NPG | CHDM | HD |
| Tg of polyester | 9° C. | −38° C. | −37° C. | −19° C. | −68° C. |
| double bond equ.-wt., g/mol* | 511 | 477 | 492 | 491 | 498 |
| H-equ.-wt., g/mol** | 332 | 309 | 318 | 317 | 322 |
| Ratio DB/H, % | 75% | 75% | 75% | 75% | 75% |
| Pendulum hardness [s] | | | | | |
| 1 day | 63 | 40 | 32 | 40 | 12 |
| 7 days | 85 | 50 | 40 | 55 | 13 |

*based on total solid resin
**based on malonate containing polymer

The data of above table 10 show that at comparable crosslinking density as well as content of soft polyether Ymer N-120 the hardness development of the cured clearcoats is highly dependent on the glass transition temperature of the polyester polyol.

Example 35: Hardness Development of Clearcoats

Components were mixed according to following table 11 on a lab blender and then applied to glass plates in a wet film thickness of 200 µm. After 1 day as well as after 1 week at 23° C./50% relative humidity the pendulum hardness was determined.

TABLE 11

| | | | | | |
|---|---|---|---|---|---|
| Resin of Example 10 (44.7%) | 50 | | | | |
| Resin of Example 32 (34.8%) | | 50 | | | |
| Resin of Example 33 (47.4%) | | | 50 | | |
| Resin of Example 30 (40.0%) | | | | 50 | |
| Resin of Example 31 (40.8%) | | | | | 50 |
| Catalyst of Example 15 | 2.5 | 1.95 | 2.7 | 2.3 | 2.3 |
| % Ymer, solids | 15% | 16% | 14% | 15% | 24%*** |
| double bond equ.-wt., g/mol* | 511 | 701 | 418 | 508 | 887 |
| H-equ.-wt., g/mol** | 332 | 331 | 333 | 661 | 661 |
| Ratio DB/H, % | 75% | 50% | 100% | 150% | 75% |
| Pendulum hardness [s] | | | | | |
| 1 day | 63 | 56 | 51 | 19 | 15 |
| 7 days | 85 | 72 | 86 | 21 | 16 |

*based on total solid resin
**based on malonate containing polymer
***the reason why a higher amount of Ymer had to be used is that only a small amount ethoxylated/propoxylated Pentaerythritol-tetraacrylate was used for co-emulsification The data of above table 11 show that the hardness development of the cured clearcoats is highly dependent on the hydrogen equivalent weight of the malonate containing polymer. At a comparable hydrogen equivalent weight the clearcoats show good hardness development at a ratio of double bonds to acidic hydrogens from 50 to 100%.

Example 36: Clearcoat for Foil and Plastic Coatings for In-Mould-Decoration Processes Recipe 1—Clearcoat
Part 1: 100 g of polyurethane dispersion from Example 10 have been mixed with 5 g of methoxypropoxypropanole, 5 g of deionized water and 1 g of a levelling and substrate wetting agent based on polyether modified polysiloxan (ADDITOL® VXW 6503N, allnex).
Part 2: Prior to application, 4.8 g of catalyst of Example 15 have been added.
Recipe 2—Metallic 1Pack Basecoat
268 g of a polyurethane dispersion was mixed with a slurry of 50 g metallic pigment 58 g butylglycol, combined with 100 g of a 3% deionized water solution of a silicate based thickener (LAPONITE®, Byk) and 110 g of a 10% deionized water solution of an acrylic based thickener (RHEOVIS®, BASF). Additionally 5 g of a levelling and substrate wetting agent based on fluoro-modified acrylic copolymer (ADDITOL® VXW 6214, allnex), 52 g of wax emulsion (ULTRALUBE®, Keim-Additec), 30 g of water and 14 g of i-Butanol were added.

The clearcoat (recipe 1) was applied 100 µm wet with a film applicator and cured for 5 minutes at 150° C. on a PET foil without pre-treatment. Afterwards the metallic basecoat (recipe 2) was applied by spray application with a resulting dry film thickness of 15 µm and again cured for 5 minutes at 150° C. The whole part was post-cured for 12 hours at 70° C. After the post-cure a release test was done and the clearcoat plus metallic basecoat could be released from the PET substrate without high force or resulting cracks in the clearcoat layer resulting in a perfect optical appearance and gloss (89 GU at 60° angle).

Example 37: Synthesis of Malonate Polyester 800.9 g diethylmalonate, 960.4 g TCD-alcohol and 555.6 g Ymer N120 and 0.35 g MBTO were heated to 175° C. during the course of two hours while ethanol was distilled off entirely and further maintained at that temperature until a resin was built with a solids content of 99.0% and a molecular weight (weight average) of 3924 g/mol. 186 g of this polyester was dispersed into 152 g water and then the dynamic viscosity and solids content adjusted with further water to a viscosity of 2700 mPas and a solids content of 44.4%. The H-equivalent weight of this polyester was 186 g/mol based on solid resin.

Example 38: Synthesis of Malonate Polyester 800.9 g diethylmalonate, 785.3 g Butylethylpropandiol and 555.6 g Ymer N120 and 0.35 g MBTO were heated to 175° C. during the course of two hours while ethanol was distilled off entirely and further maintained at that temperature until a resin was built with a solids content of 99.0% and a molecular weight (weight average) of 3817 g/mol. 186 g of this polyester was dispersed into 152 g water and then the dynamic viscosity and solids content adjusted with further water to a viscosity of 2370 mPas and a solids content of 39.5%. The H-equivalent weight of this polyester was 168 g/mol based on solid resin.

Example 39: Synthesis of Malonate Polyester 385.3 g Hexahydrophthalic anhydride, 960.4 g TCD-alcohol and 555.6 g Ymer N120, 630 g xylene and 0.35 g MBTO were heated to 180° C. and reacted whilst removing water with a water trap until a acid number of 8 mg KOH/g was reached. Then xylene was stripped off by applying vacuum and at a temperature of 140° C. 400.5 g diethylmalonate were added. Temperature was raised to 175° C. again while ethanol/water was distilled off entirely and further maintained at that temperature until a resin was built with a solids content of 99.6% and a molecular weight (weight average) of 4158 g/mol. 186 g of this polyester was dispersed into 152 g water and then the dynamic viscosity and solids content adjusted with further water to a viscosity of 2355 mPas and a solids content of 45.1%. The H-equivalent weight of this polyester was 405 g/mol based on solid resin.

Example 40: Malonate Polyesters Cured with UV-PUD

Components were mixed according to following table 12 on a lab blender and then applied to glass plates in a wet film thickness of 200 μm and cured at room temperature only or forced cured for 30 min at 80° C. After 1 day as well as after 1 week at 23° C./50% relative humidity the pendulum hardness was determined.

TABLE 12

|  | Equivalent weight*** | | | | | | | |
|---|---|---|---|---|---|---|---|---|
| UCECOAT ®7738* (38%) | 1096 g/mol | 109.6 | 54.8 | 109.6 | 109.6 | 27.4 | 109.6 | 109.6 | 109.6 |
| Resin of Example 37 (44%) | 424 g/mol | 42.4 | 42.4 | 21.2 | 10.6 | 42.4 | | | |
| Resin of Example 38 (40%) | 408 g/mol | | | | | | 40.8 | | |
| Resin of Example 39 (45%) | 898 g/mol | | | | | | | 89.8 | |
| Resin of Example 3 (38%) | 781 g/mol | | | | | | | | 78.1 |
| Catalyst of Example 15 | | 7.59 | 4.97 | 6.42 | 5.85 | 3.72 | 7.30 | 10.33 | 8.98 |
| Diol in Polyester polyol | | TCD | TCD | TCD | TCD | TCD | BEPD | TCD | NPG |
| Ratio double bonds/active —CH, % | | 100% | 50% | 200% | 400% | 25% | 100% | 100% | 100% |
| Pendulum hardness [s], room temperature | | | | | | | | | |
| 1 day | | 59 | 105 | 60 | 59 | 18 | 38 | 9** | 18 |
| 7 days | | 123 | 130 | 88 | 91 | 18 | 108 | 56 | 64 |
| Pendulum hardness [s], 30 min/80° C. | | | | | | | | | |
| 1 day | | 170 | 122 | 114 | 91 | 17 | 144 | 75 | 116 |
| 7 days | | 179 | 135 | 120 | 95 | 17 | 155 | 91 | 108 |

*see Table 8
**sticky
***double bond or H-equivalent weight based on total resin solution The data show that a molar ratio of double bonds to acidic hydrogens between 0.5:1 to 4:1 is resulting in good hardness development. Also the use of higher Tg polyols are favorable against lower Tg polyols. Hardness development is better the lower the H-equivalent weight of the polyester component.

Example 41: Topcoat Formulation

A white topcoat was formulated according to following recipe on a bead mill. Then the mill base was let down with further resin, butylglycoleacetate and substrate wetting agent.

| | |
|---|---|
| Resin of Example 10 | 42.15 |
| ADDITOL VXW 6208* | 2.85 |
| KRONOS 2310** | 54.70 |
| ADDITOL VXW 6386*** | 0.30 |
| | 100.00 |
| Resin of Example 10 | 106.07 |
| Butylglykolacetate | 5.15 |
| ADDITOL VXW 6503 N**** | 0.62 |
| | 211.84 |

*Dispersing agent (50% solids) with an acid value of 45 mgKOH/g, solids
**pigment based on titanium dioxide
***defoamer based on mineral oil and hydrophobic waxes
****substrate wetting additive (50% solids) based on trisiloxane Adhesion to Aged Epoxy Primer Steel panels were coated with water based 2k epoxy primer and cured for 24 hours at 60° C. The topcoat formulation from Example 41 was mixed with the components of following table and applied in a wet film thickness of 150 μm by draw down. The topcoats were cured at 20° C./50% relative humidity for 7 days. Then interlayer adhesion was tested by applying cross-cut test (0=good, 5=bad adhesion).

| Topcoat form of Ex. 41 | 50.00 | 50.00 | 50.00 | 50.00 | 50.00 | 50.00 |
|---|---|---|---|---|---|---|
| TMP-TriAcAc* | 1.00 | 0.50 | 0.25 | | | |
| UV-PUD** | | | | 2.50 | 5.00 | |
| Catalyst from Ex. 15 | 1.84 | 1.84 | 1.84 | 1.84 | 1.84 | 1.84 |
| Adhesion after 7 days RT | 0 | 0 | 0-1 | 1-2 | 0-1 | 5 |

*Trimethylolpropane triacetoacetate
**mixed anionically and nonionically stabilized waterbased urethane acrylate with a mass fraction of solids of 38%, an acid value of 0.9 mgKOH/g (based on the mass of the resin dispersion), a specific amount of substance of >C=C< double bonds of 2.4 eq/kg (based on the mass of the resin) and a content of BADGE-acrylate reacted into the polyurethane chain of 40 % based on solid resin Both, the Trimethylolpropane triacetoacetate as well as the UV-PUD based on BADGE-acrylate improve adhesion to aged epoxy primer.

Example 42: Water Dispersable Polyurethane with Malonate and Acryloyl Functionality 1245 g of Ymer® N120, 3388 g of the malonate polyester polyol of Example 1a, 255 g of PC-diol, 467.5 g of PETIA, 408 g of di-TMPA3, 500 g of EOPO-PEA4, 595 g of di-TMPA4, 1.8 g of DBTL, and 8.1 g of butylhydroxytoluene were heated to 60° C. while purging with air. Over the course of two hours, 1293 g of IPDI were added and the temperature was maintained at 70° C. until a mass fraction of isocyanate groups in the reaction mixture of 0.7% was reached. 430 g of methoxypropanol were then added, and the temperature was maintained for one further hour. Then a mixture of 1149 g methoxypropanol and 114.2 g diethanolamin were added and homogenized for 5 minutes before 1967 g methoxypropylacetate were added. The resin obtained had a mass fraction of solids of 68.8% and a dynamic viscosity of 4040 mPa@s. 17 g of this water dispersable resin were mixed with 20 g of aqueous dispersion obtained in Example 37, 53 g of UCECOAT®7738 and 11 g of water to obtain a stable dispersion with a solids content of 40.3% and a dynamic viscosity of 366 mPas.

The invention claimed is:

1. A water dispersible self-emulsifying polymer US comprising Michael donor groups,
  wherein the polymer chain of the polymer US comprises at least one selected from the group consisting of ester groups and urethane groups as parts of the repeating units,
  wherein the polymer US has as further constituents in the polymer chain, incorporated moieties that have pending hydrophilic groups and/or hydrophilic groups that are other than the at least one selected from the group consisting of ester groups and urethane groups as parts of the repeating units, and that are structural elements of a hydroxy-functional component A having at least one hydrophilic moiety that is nonionic when derived from a compound An, or anionic when derived from a compound Aa, or has both anionic and nonionic substructures when derived from a compound Aan,
  wherein the compound Aa has at least one hydroxyl group and an acid group,
  wherein the compound An is:
    a component An1 which is a monoalkylether of a polyoxyalkylene glycol having from one to four carbon atoms in the alkyl group, and from two to four carbon atoms in the alkylene group which is linear or branched, and where the polyoxyalkylene group is bound with the remaining hydroxyl group by an ether bond to a dihydric alcohol, to yield a monohydroxy-functional component An11, or to an at least trihydric alcohol to yield a dihydroxy-functional, or higher functional component An12, and/or
    a polyoxyalkylene glycol An2 having two hydroxyl groups, wherein the alkylene group is linear or branched and has from two to four carbon atoms in the alkylene group,
  wherein the compound Aan is a mixture of the compound Aa and the compound An,
  wherein the polymer US has a number average molar mass of at least 500 g/mol,
  wherein the Michael donor groups are acidic C—H groups from activated methylene and/or methine groups, the carbon atom of the acidic C—H group being attached to at least one electronegative substituent,
  wherein the polymer US, comprises, on average, at least two acidic C—H groups per molecule,
  wherein the specific amount of acidic C—H groups in the polymer US is at least 0.5 mol/kg, and
  wherein the amount of acidic C—H groups in the polymer US is derived in majority from malonate moieties.

2. The water-dispersible polymer as claimed in claim 1, wherein the specific amount of acidic C—H groups in the polymer US provided from malonate moieties is at least 0.5 mol/kg.

3. The water-dispersible polymer as claimed in claim 1, wherein the self-emulsifying polymer US comprises urethane groups as repeating units derived from the hydroxy-functional component A, and is obtained by reacting a hydroxy-functional component B having acidic C—H groups that is a polyester polyol, said hydroxy-functional component A and an isocyanate-functional compound Di, and optionally with one or more hydroxy-functional components B".

4. The water-dispersible polymer as claimed in claim 3, wherein the hydroxy-functional component B having acidic C—H groups that is a polyester polyol has a glass transition temperature Tg of at least −50° C.

5. The water-dispersible polymer as claimed in claim 1, wherein the self-emulsifying polymer US comprises ester groups as repeating units, moieties derived from the hydroxy-functional component A, and is obtained by reacting an alkyl ester of malonic acid Bm, said hydroxy-functional component A and one or more hydroxy-functional components Dh.

6. The water-dispersible polymer as claimed in claim 3, wherein the hydroxy-functional component A is selected from nonionic hydrophilic compounds An12 which are dihydroxy-functional monoethers of trimethylolalkanes having from four to ten carbon atoms with monohydroxy-functional oligomeric or polymeric oxyalkylene alkyl ethers, where the alkyl group has from one to four carbon atoms, and the alkylene groups have from two to four carbon atoms.

7. The water-dispersible polymer as claimed in claim 1, which additionally comprises Michael acceptor groups, wherein Michael acceptor groups are chemically bound to the backbone of the polymer US by using a further constituent E in the synthesis of the polymer US, which constituent E has at least one, hydroxyl group, and at least one activated olefinically unsaturated group, wherein activation of the unsaturated group is effected by at least one electronegative group.

8. The water-dispersible polymer as claimed in claim 7, wherein the Michael acceptor groups are acryloyl groups.

9. The water-dispersible polymer as claimed in claim 3, wherein the polymer US comprises urethane groups as repeating units and is obtained by reacting the hydroxy-functional component B having acidic C—H groups that is a polyester polyol, the hydroxy-functional component A, a hydroxy-functional acrylate compound E, and the isocyanate-functional compound Di, and optionally with one or more hydroxy-functional components B".

10. The water-dispersible polymer as claimed in claim 5, wherein the polymer US comprises ester groups as repeating units and is obtained by reacting an alkyl ester of malonic acid Bm, the hydroxy-functional component A, one or more hydroxy-functional components Dh, and at least one hydroxy-functional acrylate compound E.

11. The water-dispersible polymer as claimed in claim 7, wherein the relative molar ratio of double bonds provided by the Michael acceptor to the acidic C—H groups from the Michael donor are from 10 to 250%.

12. The water-dispersible polymer as claimed in claim 6, wherein the amount of hydroxy-functional component An12 is such that the amount of oxyalkylene in the polymer US is from 5 to 50 weight %.

13. The water-dispersible polymer as claimed in claim 5, wherein the hydroxy-functional component A is selected from nonionic hydrophilic compounds An12 which are dihydroxy-functional monoethers of trimethylolalkanes having from four to ten carbon atoms with monohydroxy-functional oligomeric or polymeric oxyalkylene alkyl ethers, where the alkyl group has from one to four carbon atoms, and the alkylene groups have from two to four carbon atoms.

14. The water-dispersible polymer as claimed in claim 13, wherein the amount of hydroxy-functional component An12 is such that the amount of oxyalkylene in the polymer US is from 5 to 50 weight %.

15. The water-dispersible polymer as claimed in claim 5, wherein each of the one or more hydroxy-functional components Dh is a cycloaliphatic or branched aliphatic diol Bh.

16. An aqueous polymer dispersion wherein the dispersed polymer is a self-emulsifying polymer US according to claim 1.

17. The aqueous polymer dispersion of claim 16, which additionally comprises Michael acceptor groups, wherein
Michael acceptor groups are chemically bound to a carrier compound different from the polymer US, preferably to an oligomeric or polymeric carrier compound, which preferably is co-emulsified in the polymer dispersion or blended therewith, or
Michael acceptor groups are chemically bound to the backbone of the polymer US and Michael acceptor groups are chemically bound to a carrier compound different from the polymer US.

18. The aqueous polymer dispersion as claimed in claim 17, wherein the Michael acceptor groups are acryloyl groups.

19. The aqueous polymer dispersion as claimed in claim 18, wherein the carrier compound different from the polymer US is selected from water-dispersible urethane acrylates.

20. The aqueous polymer dispersion as claimed in claim 16, wherein Michael acceptor groups are built into the polymer US.

21. A coating composition comprising at least one water-dispersible polymer according to claim 1, prepared by adding thereto a catalyst to promote the Michael addition reaction, and optionally a Michael acceptor component, and wherein the ratio $n(C-H)/n(>C-C<)$ of the amount of substance $n(C-H)$ of activated acidic protons C—H in the Michael donor component to the amount of substance $n(>C-C<)$ of activated unsaturated groups >C—C< in the Michael acceptor component is between 10 mol/mol and 0.1 mol/mol.

22. The coating composition of claim 21 wherein the catalyst is a latent base catalyst which is blocked as a carbonate and/or a carbamate salt.

23. The coating composition of claim 21 additionally comprising one or more of photoinitiators, pigments, fillers, dispersants, antisettling agents, sag control agents, light or UV stabilisers, flow modifiers, levelling agents, thickeners, defoamers, wetting agents, surfactants, adhesion promoting agents, coalescence agents, corrosion inhibitors, matting agents, flame retardants, slip additives, anti-stain additives, and anti-graffiti additives.

24. A coated substrate which has been coated with a coating composition according to claim 21, and wherein the coating composition has cured at a temperature above 0° C.

25. A coated substrate which has been coated with a coating composition according to claim 21, and wherein the coating composition has cured at a temperature above 0° C. and by exposure to radiation, and wherein the coating composition preferably contains a photoinitiator if UV light is chosen as source of radiation.

26. A coating composition comprising at least one water-dispersible polymer according to claim 7 and a latent base catalyst which is blocked as a carbonate and/or a carbamate salt.

\* \* \* \* \*